United States Patent
Cragun et al.

(10) Patent No.: US 7,155,401 B1
(45) Date of Patent: *Dec. 26, 2006

(54) AUTOMATIC SALES PROMOTION SELECTION SYSTEM AND METHOD

(75) Inventors: Brian John Cragun, Rochester, MN (US); Todd Mark Kelsey, Rochester, MN (US); Stephen Hollis Lund, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/004,034

(22) Filed: Jan. 7, 1998

Related U.S. Application Data

(62) Division of application No. 08/363,053, filed on Dec. 23, 1994, now Pat. No. 5,774,868.

(51) Int. Cl.
*G06F 17/60* (2006.01)

(52) U.S. Cl. .......................................... 705/10; 705/14
(58) Field of Classification Search ................. 705/1, 705/10, 14, 16, 26
See application file for complete search history.

(56) References Cited

U.S. PATENT DOCUMENTS

| | | | |
|---|---|---|---|
| 4,630,108 A | 12/1986 | Gomersall | |
| 4,908,761 A | 3/1990 | Tai | |
| 4,910,672 A | 3/1990 | Off et al. | |
| 4,930,077 A | 5/1990 | Fan | |
| 5,057,915 A | 10/1991 | Von Kohorn | |
| 5,124,911 A | 6/1992 | Sack | |
| 5,353,218 A | 10/1994 | De Lapa et al. | |
| 5,353,219 A | 10/1994 | Mueller et al. | |
| 5,383,111 A | 1/1995 | Homma et al. | |
| 5,401,946 A | 3/1995 | Weinblatt | 235/381 |
| 5,459,306 A | 10/1995 | Stein et al. | 235/383 |
| 5,482,139 A | 1/1996 | Rivalto | 186/36 |
| 5,504,675 A | 4/1996 | Cragun et al. | |
| 5,521,813 A * | 5/1996 | Fox et al. | |
| 5,649,114 A * | 7/1997 | Deaton et al. | |
| 5,774,868 A * | 6/1998 | Cragun et al. | |
| 5,839,117 A * | 11/1998 | Cameron et al. | |

FOREIGN PATENT DOCUMENTS

WO WO 93/04449 * 3/1993

OTHER PUBLICATIONS

"Japan Knowledge Industry Develops Sales Planning", Comline Computers, pp. 2, Apr. 1993.*

C. Klimasauskas, "Brainy New Player: Neural Nets In Industrial Automation", Electronic Engineering Times, pp. 22, Mar. 1991.*

*The (New) Turing Omnibus*, by A.K. Dewdney, W.H. Freeman and Company (1993), at pp. 181–187 and 241–249.

* cited by examiner

*Primary Examiner*—Jeffrey D. Carlson
(74) *Attorney, Agent, or Firm*—Wood, Herron & Evans, LLP

(57) ABSTRACT

An automated sales promotion selection system uses neural networks to identify promising sales promotions based on recent customer purchases. The system includes a customer information device that receives customer data relating to customer purchases of items from an inventory of items, a central processing unit having a sales promotion neural network and a storage unit containing a plurality of item identifiers comprising potential customer purchases of additional items from the inventory, wherein the sales opportunity neural network responds to customer data received from the customer information device by determining if one or more of the item identifiers in the storage unit corresponds to an item likely to be purchased by one of the customers, and an output device that receives the item identifiers of the likely purchases determined by the sales promotion neural network and produces a sales promotion relating to at least one of the item identifiers.

21 Claims, 19 Drawing Sheets

AUTOMATIC SALES PROMOTION SELECTION SYSTEM AND METHOD

CROSS-REFERENCE TO RELATED APPLICATIONS

This application is a divisional of U.S. Ser. No. 08/363,053, filed on Dec. 23, 1994 by B. Cragun et al., and entitled "Automatic Sales Promotion Selection System and Method", now Pat. No. 5,774,868 which application is incorporated by reference herein.

BACKGROUND OF THE INVENTION

1. Field of the Invention

This invention relates generally to sales promotion systems and, more particularly, to real-time automatic selection of sales promotions based on analysis of previous customer purchases.

2. Description of the Related Art

Sales promotions can encompass a wide variety of different actions and procedures designed to stimulate product sales. Sales promotion include, for example, in-store purchase suggestions from sales clerks, limited-time price reductions on items, in-store announcements of products over public address systems, coupons distributed in a store to shoppers or distributed via newspaper and magazine inserts to readers for future redemption with a purchase, and more sophisticated multimedia programs presented over special display kiosks that play to passers-by. Decisions on particular sales promotions to be employed are frequently made as part of a national or regional marketing campaign in which data concerning sales trends might be studied to discern patterns that could help in the sales promotion decision. Often, the sales promotion to be used at a particular store and the time at which the promotion will be used are left to management at each store or to individual sales clerks and other store personnel.

Trends in purchases are sometimes relatively simple to observe. For example, there typically is a seasonal need for particular items, such as coats during winter or sandals during summer. Both national and local marketing campaigns might choose to call attention to such items through a sales promotion comprising a temporary price reduction. Presumably, customers will be motivated by the seasonal need and by the price reduction to purchase the items, thereby creating higher volume sales and increased profits. Another example of an in-store sales promotion is one that occurs after a sales clerk completes a transaction for the purchase of an item by suggesting the purchase of a complementary item. A typical suggestion occurs when, for example, a clerk suggests the purchase of an electric light bulb after a customer has already purchased a lamp or suggests a sauce or topping to go along with a purchased food entree. Given a set of sales promotions from which a promotion is selected, a better quality selection is one that is more likely to result in an additional purchase.

The quality of a sales promotion selection can vary greatly in accordance with the skill of the individual making the selection. For example, individual sales clerks and store managers can vary greatly in their ability to recognize opportunities in particular purchase transactions by customers and can be at an extreme disadvantage in attempting to recognize trends across a larger customer population to fashion promotional campaigns. Making the selection of sales promotions more centralized can be advantageous in that persons more highly skilled in discerning buying patterns can be brought to bear on the problem and data from a wide customer population can be gathered and analyzed for such patterns. This would likely result in better identification of buyer preferences and would thereby improve the quality of the selection.

Analysis of sales data to discern buyer preferences is known, but unfortunately takes place relatively far removed in time from the retail customer. That is, the sales data must be gathered, analyzed, and used to generate selection criteria for sales promotions and any trend revealed in the data might have come to a halt by the time conventional analysis is completed. This is especially true in the case of seasonal trends, which might not be identified as seasonal until the purchasing fervor for an item has ended. Moreover, the generation of selection criteria can be problematic, as the recognition of trends in the sales data can be highly dependent on the skill of individual analysts.

It would be advantageous to permit analysis of sales data and recognition of trends to occur closer to the retail end of the distribution chain. This would permit selection of a sales promotion to be based on relatively recent customer purchases and timely identification of emerging trends. It also would be advantageous if the selection of a sales promotion could occur in real time at the point of customer purchase or store entry, further enhancing the timeliness of the sales promotion selection process. Finally, it would be advantageous to automate the selection process, thereby removing individual skill at the local level from influencing the selection and permitting greater data analysis to take place.

From the discussion above, it should be apparent that there is a need for a system that automatically selects sales promotions, both in-store and telemarketing, based on analysis of previous customer purchases on a real-time basis. The present invention satisfies this need.

SUMMARY OF THE INVENTION

In accordance with the invention, an automated sales promotion selection system uses computer-implemented artificial neural networks, hereafter referred to as neural networks, neural nets, or simply nets, to identify desirable sales promotions based on recent customer purchases. The system includes a customer information device that receives customer data relating to customer purchases of items from an inventory of items, a central processing unit having a sales promotion neural network and a storage unit containing a plurality of item identifiers comprising potential customer purchases of additional items from the inventory, and an output device that receives the item identifiers of the likely purchases determined by the sales promotion neural network and produces a sales promotion relating to at least one of the item identifiers. The sales opportunity neural network responds to customer data received from the customer information device by determining if one or more of the item identifiers in the storage unit corresponds to an item likely to be purchased by one of the customers.

In one aspect of the invention, an automated sales promotion system selects item identifiers of potential purchases for a customer by using neural networks to place the items purchased by the customer into predetermined and adaptable purchase groups comprising items that are frequently purchased together and to determine items that are not among the purchased items and that otherwise would comprise one of the predetermined purchase groups. The system then automatically selects the items determined to be missing as the item identifiers of potential customer purchases. The missing items can then be suggested by a sales clerk for purchase or can be the subject of an automatically produced promotion, such as a coupon that can be redeemed for a discounted purchase price.

In another aspect of the invention, customer data is generated by training a demographics neural network that generates an output set of data defining predicted purchases of customers during a purchasing transaction, the trained neural network is then provided with prediction data comprising the current date, current time of day, and environmental information, and another neural network is used to predict customer purchases.

Other features and advantages of the present invention should be apparent from the following description of the preferred embodiment, which illustrates, by way of example, the principles of the invention.

DESCRIPTION OF THE PREFERRED EMBODIMENT

Figure 1:
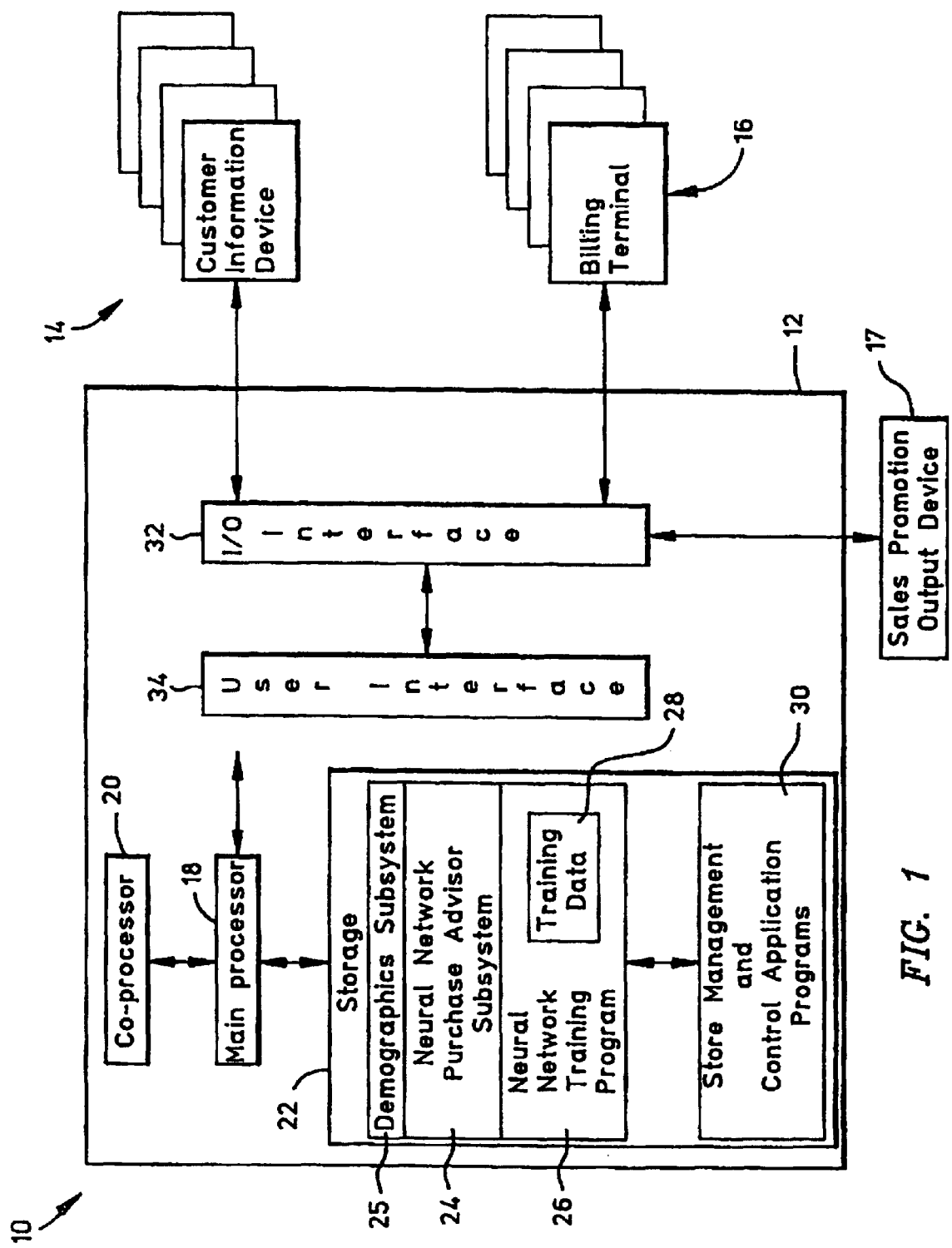
FIG. 1 is a block diagram of an automatic sales promotion selection system constructed in accordance with the present invention.

FIG. 1 shows an automatic sales promotion selection system 10, construction in accordance with the present invention, having a computer system 12 that communicates with one or more customer information devices 14 and billing terminals 16. As a customer purchases items in a store, at an order desk, or over the telephone, information concerning the purchase transaction is collected by the customer information devices 14. The devices can comprise, for example, sales registers located throughout a store or data terminals operated by clerks at order desks. The purchase transaction information is passed on to the computer system 12, which shares the information with the billing terminals 16, which generate appropriate sales receipts or invoices. The computer system 12 analyzes the collected purchase transaction information for a customer to segment the items purchased into purchase classes that comprise groups of items ordinarily purchased together. The system then uses neural networks to identify items that are missing from a purchase transaction that are members of a purchase class otherwise represented in the purchase transaction. The missing items can then be the subject of a purchase suggestion, an automatically dispensed coupon, or other sales promotion indicated by an output device 17 such as a printer or display terminal. In this way, the sales promotion selection system 10 automatically collects purchase transaction data, analyzes the data relating to a particular customer purchase transaction, and uses neural networks to select a sales promotion calculated to result in additional purchases.

The computer system 12 operates under control of a main processor 18, also referred to as a central processing unit (CPU). A co-processor 20 assists the CPU with mathematical operations and other dedicated processing tasks. The CPU retrieves and stores data from a memory storage unit 22, which includes a neural network purchase advisor subsystem 24 having neural networks that process purchase data as described further below. The purchase advisor subsystem also includes a neural network training program 26, which makes use of a training data section 28, and also communicates with a variety of storage management and control application programs 30 of the storage memory unit 22.

The customer information devices 14 and billing terminals 16 communicate with the computer system 12 using an input/output interface 32, which in turn is connected to a user interface 34 that communicates with the CPU 18. The sales output device 17 also is connected to the input/output interface and can comprise, for example, a coupon printer or an audio-video presentation device that automatically executes an in-store promotional program selected by the purchase advisor subsystem 24. The customer information devices, billing terminals, and sales output devices can all be placed within a single store, order desk, shopping area, or other purchase location, or can be spread among several geographically disparate purchase locations.

Figure 2:
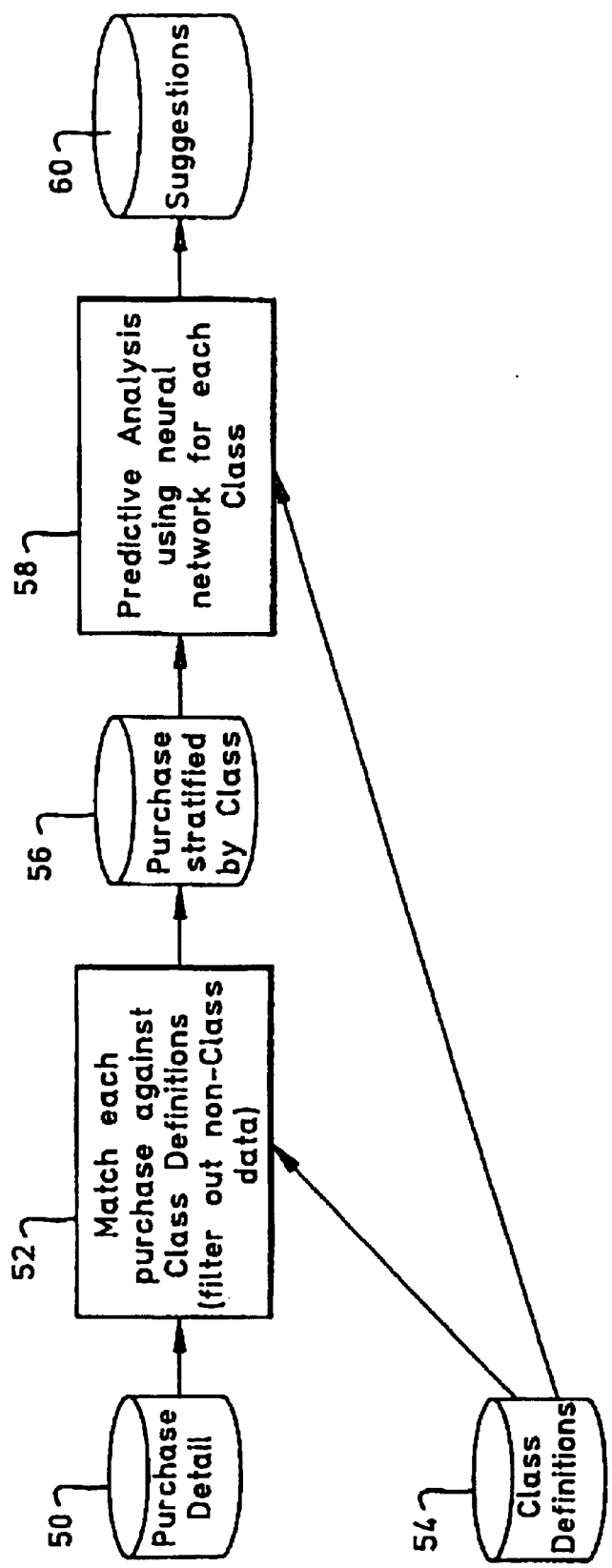
FIG. 2 is a flow diagram representation of the processing steps followed by the system illustrated in FIG. 1 in selecting a sales promotion.

The general processing flow of the neural network purchase advisor subsystem 24 of FIG. 1 is illustrated in the flow diagram of FIG. 2. As items are purchased in a store, the neural network purchase advisor subsystem is invoked under the control of the CPU 18. The purchase advisor subsystem includes, for example, a purchase advisor software program stored in the memory storage unit. Purchase details comprising purchase transaction data from a customer purchase are automatically stored into the memory 22 as a sales clerk registers the purchases, as represented by the first flow diagram box numbered 50 in FIG. 2. In the next step, represented by the flow diagram box numbered 52, purchase items listed in the purchase transaction data are compared against predetermined purchase class definitions. In this step, purchase items that have not been characterized as fitting into one of the predetermined purchase classes are filtered out of the purchase data. This reduces the amount of data that must be analyzed. The class definitions are obtained from the memory storage unit 22, as represented by the flow diagram box numbered 54.

For each class containing items that match with one or more of the items purchased, a sublist is created by the CPU 18. That is, the purchase items are segmented into various purchase classes and may fit into more than one class. The CPU creates a list of the purchase items belonging to each class. This step is represented by the flow diagram box numbered 56. The segmentation of purchase items into those belonging to a purchase class and those not classified is performed because of the limited input fields that can be accommodated by the computer system 12, as compared to the potentially thousands of items that might be stocked by a business. Typically, very little purchase data is filtered out because purchasers generally have specific goals and buying habits when shopping, that typically are organized around purchase classes, so that most items belong to one of the purchase classes. Further, later retraining of the neural net will incorporate commonly purchased items that might have been overlooked in the original class divisions.

Examples of segmentation for grocery stores might include purchase classes such as health food, party food, so-called "junk" food, and ethnic or culture-specific foods. Other purchase classes might include an automotive repairs class, a household electrical supply class, medical preparations, and the like. Classes may include items that have a purchase relationship but that do not clearly fit into an aptly named category. Analysis of purchase information might be necessary to identify such classes. Each one of the classes comprises a list of purchase items that, based upon analysis of historical data, define items frequently purchased together. Initially, the members of a class are set by persons with empirical knowledge of customer buying habits. Actual purchase information can be used thereafter to update class membership as trends are identified, as described in greater detail below.

In accordance with the preferred embodiment, each one of the purchase classes is associated with a different neural network. For each class, the purchase items that fit within the class are processed through the neural network for that class to predict missing items that ordinarily are purchased in a transaction at the same time as the purchase items, as represented by the flow diagram box numbered 58 in FIG. 2. These additional items are suggested to the customer for purchase, as indicated by the flow diagram box numbered 60. Each purchase advisor neural network makes use of probability threshold values that limit the number of items identified as missing from a purchase to only those items that have a sufficiently high probability of actually belonging to the class. The threshold reduces the chance of making a futile purchase suggestion because a customer has purchased an item for which there was a specific need rather than because of a class-related interest or activity. Once the neural network has selected an item for suggestion, the suggestion can be provided in a variety of ways, including delivery of coupons or brochures in the store or for later mail delivery, or by a cue to a sales clerk to provide a verbal suggestion. Aspects of the neural networks employed in the preferred embodiment will next be discussed in greater detail.

The artificial neural network used in this embodiment has a feed forward architecture using a back propagation learning algorithm. The details of such network construction will be understood by those skilled in the art without further explanation. Artificial neural networks are the result of attempting to model biological processes, including motor skills such as reaching or grasping objects and recognition behavior such as pattern completion or language syntax. Such biological processes have been best modelled by information systems in which various aspects of information in the system can influence (or modify), and can be influenced by, other aspects of information in the system. One set of information systems that exhibit such behavior are commonly referred to as parallel distributed processing models and are frequently used as the architecture for neural networks.

In a parallel distributed processing model, information processing takes place through interactions of simple processing elements that send excitatory and inhibitory signals to other processing elements. In a neural network, a data item is represented in numerical form and is presented to the neural network. In this context, the processing elements referred to as neurons can represent, for example, hypotheses about which sales promotion program is most likely to elicit viewer interaction given a weather season or which sales promotion program is most likely to attract viewers given a particular time of day. In the preferred embodiment, neural network architecture comprises a first group of input neurons, each of which are connected to one or more layers of intermediate neurons. The layers of intermediate neurons are connected together and ultimately to a layer of output neurons. Information is processed by the network as data flows from the input neurons, through the intermediate layers, and finally to the output neurons. Each neuron in one layer is connected to every neuron in adjacent layers.

Network architectural details depend on the particular assumptions made about the process being modelled and the learning paradigm to be followed. In the preferred embodiment, each neuron in a neural network operates such that it adds together all data it receives, multiplies the sum by the connection weights, and then provides the result to the neurons in the next layer. The summed data typically is modified, in a nonlinear fashion, before it is provided to the next layer. The function that modifies the summed data can be implemented, for example, as a sigmoidal function, which fits the range of summed data values within an interval from −1 to +1, which is represented as [−1, +1]. A variety of sigmoidal functions have been used in neural networks to provide the nonlinearity, among them hyperbolic tangent and arc tangent functions.

Thus, each of the processing units, or neurons, in a neural network has a time-dependent activation value that is operated on by a function to produce an output value. The output value is passed through connections and provided as input to the next layer of neurons. The connections between neurons are unidirectional, moving from the input layer through the intermediate layers and finally to the output layer. Each connection is associated with a number that provides a weighting function for the connection. The weighting function determines the amount of effect that a first neuron has on the information provided to a second neuron.

All of the inputs to a neuron processing unit are combined by an arithmetic operator, such as addition, and the combined inputs, along with the current activation value of the neuron, are operated on by an activation function to determine the new activation value of that neuron. Thus, each neuron in the neural network performs the relatively simple tasks of receiving input from its neighbors and computing an output value, which it sends to its neighbors. An advantage of neural network models is that the connection weighting functions are not fixed. That is, the neural connection weights can be modified as a function of what the model experiences. In this way, the system can learn and evolve.

The state of the neural network at any time can be represented by vectors, or matrices, that specify the activation values of the neurons. Because each neuron includes an output function that maps the current activation state to an output value, the current set of output values of the network can be represented by an output value vector. Typically, the output functions implement some type of threshold function in which a neuron has no affect on another neuron until the activation value of the neuron exceeds a predetermined value. Alternative output functions include the identity function, in which the output value is equal to the activation value, and stochastic functions, in which the output value is a probabilistic function of the activation value.

As noted above, the output from one neuron is connected to other neurons through weighted connections. A positive weight indicates what is referred to as an excitatory input and a negative weight indicates what is referred to as an inhibitory input. The set of connection weights also can be represented as a matrix of values. For example, the connections can be represented by a weight matrix W wherein a matrix element w(i,j) represents the connection from a neuron $n_j$ to another neuron $n_i$. If the value of w(i,j) is positive, then $n_j$ excites $n_i$. If w(i,j) is negative, then $n_j$ inhibits $n_i$. The absolute value of w(i,j) represents the strength of the connection. Other patterns of connectivity require different arrangements of weight matrices, and will occur to those skilled in the art.

The process of adjusting the connection weights is commonly referred to as training the neural network. In the training process, the set of weighting functions are initialized to starting values, which typically are zero or are randomly set within a predetermined range of values. Inputs are provided to the network and output values are determined. The output values are assessed for "success", which is defined according to the process being modelled. For example, if a neural network selects an inventory item as a sales opportunity, a success might be defined to be those inventory items that have a high likelihood of belonging to the selected purchase class and that result in an additional purchase. The details involved in the training process should be well-known to those skilled in the art and no further explanation should be necessary. See, for example, the text entitled *Parallel Distributed Processing: Explorations in the Microstructure of Cognition* by D. Rumelhart, J. McClelland, and the PDP Research Group (1986) and also *The (New) Turing Omnibus* by A. Dewdney (1993) at pages 181–187 and 241–249.

Figure 3:
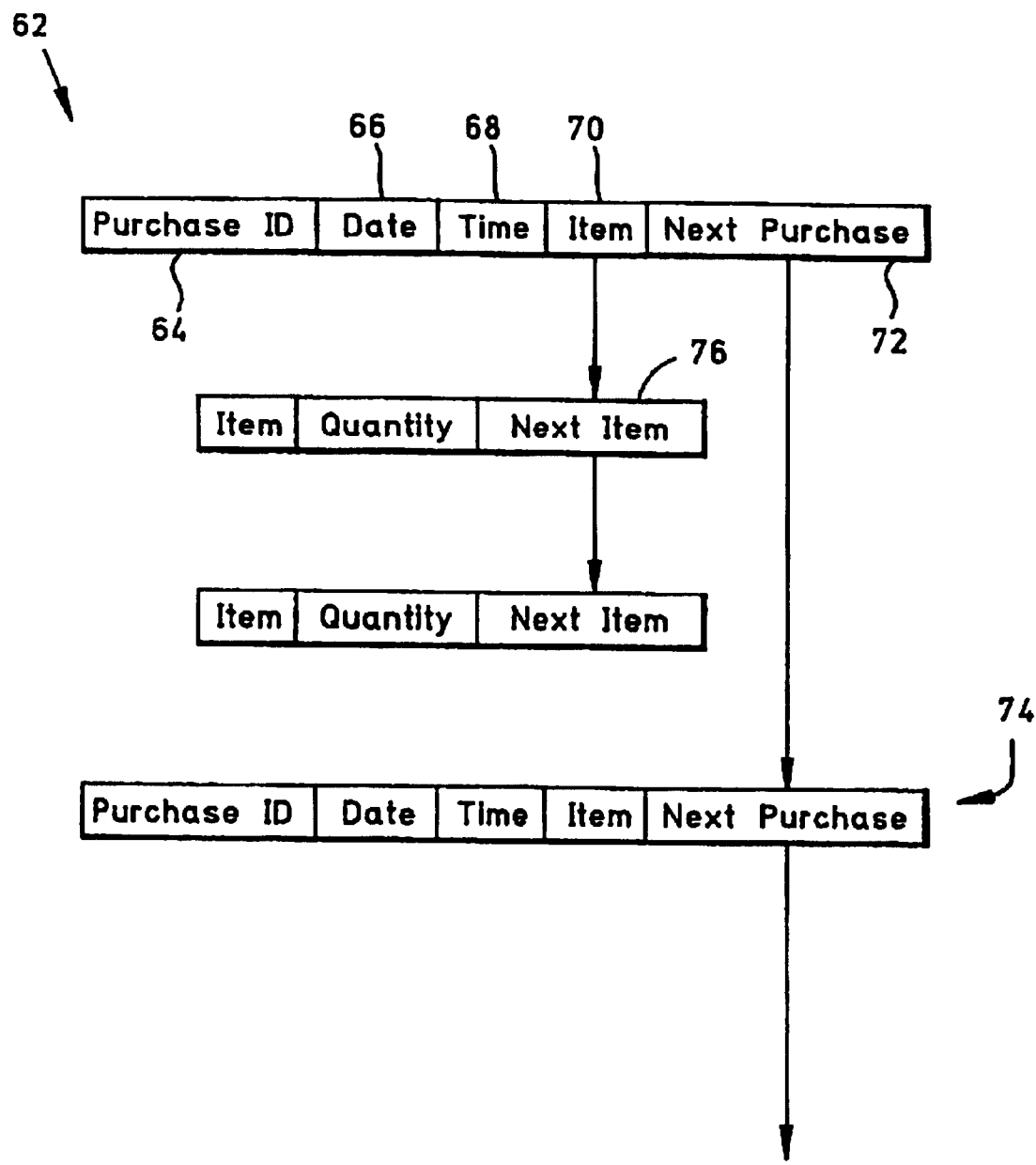
FIG. 3 is a representation of a data structure used by the processor of FIG. 1 to contain purchase data.

FIG. 3 is a representation of the data structure 62 used by the computer system 12 of FIG. 1 in constructing the purchase data. The data structure is referred to as the purchase detail file. FIG. 3 shows that the purchase detail file 62 contains information fields including a purchase identification number 64, also referred to as a transaction number, the date of the purchase 66, the time of the purchase 68, a first item number 70 that identifies an item purchased during the store visit, and a pointer 72 to a next purchase data record 74. Each purchase identification number 64 corresponds to a single transaction, such as the purchase of multiple items during a single store visit. An item number identifies a product and corresponds to a stock number, inventory number, or the like. FIG. 3 also shows that, for each item purchased during a store visit, a pointer 76 indicates the next item purchased during that visit, again specifying the item and the quantity of the item purchased.

Figure 4:
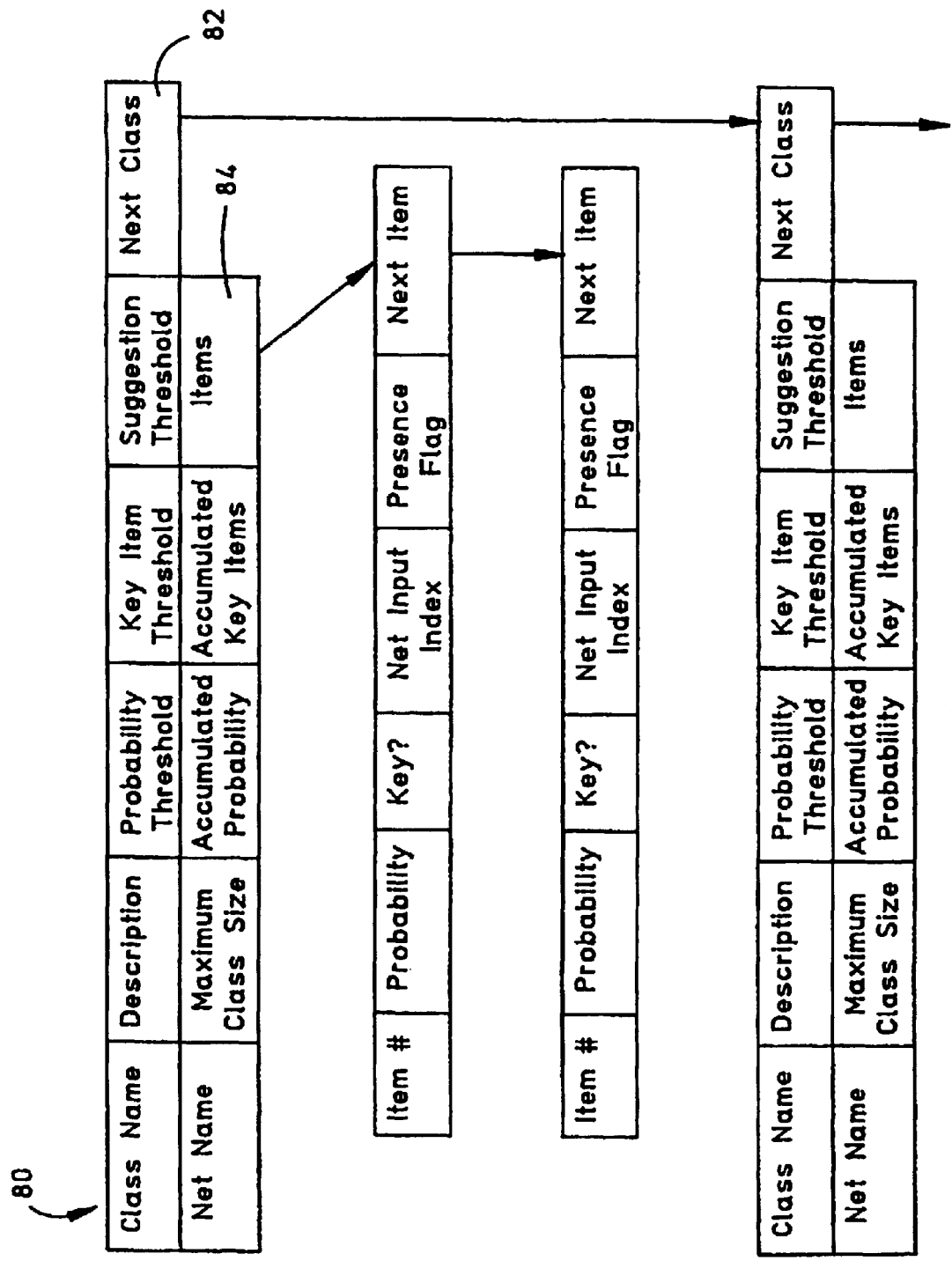
FIG. 4 is a representation of a data structure used by the processor of FIG. 1 to contain purchase class definitions.

FIG. 4 is a representation of the data structure 80 that defines the classes. The data structure is referred to as the class definition file. The class definition file includes fields comprising the class name, a short descriptive identifier, a probability threshold that indicates class significance if exceeded, a key item threshold value that indicates the class is significant if exceeded, a suggestion threshold value, an associated network name, a maximum class size value, an accumulated probability value, and accumulated key items. The data in the accumulated fields are the result of processing described further below. Also included in the class definition file is a next class pointer 82 that points to the next class and also an item pointer 84 that points to a linked list of the next item in the class.

Each of the class members in the class definition file is associated with an item number, an item probability value, a key item flag, a network input index, a presence flag to indicate whether the item is among the purchase items, and the pointer to the next item in the class. The item probability value corresponds to the probability of finding the item in the class. The network input index is an input index for directing the input data to the proper neural network input neuron, as described above.

Figure 5:
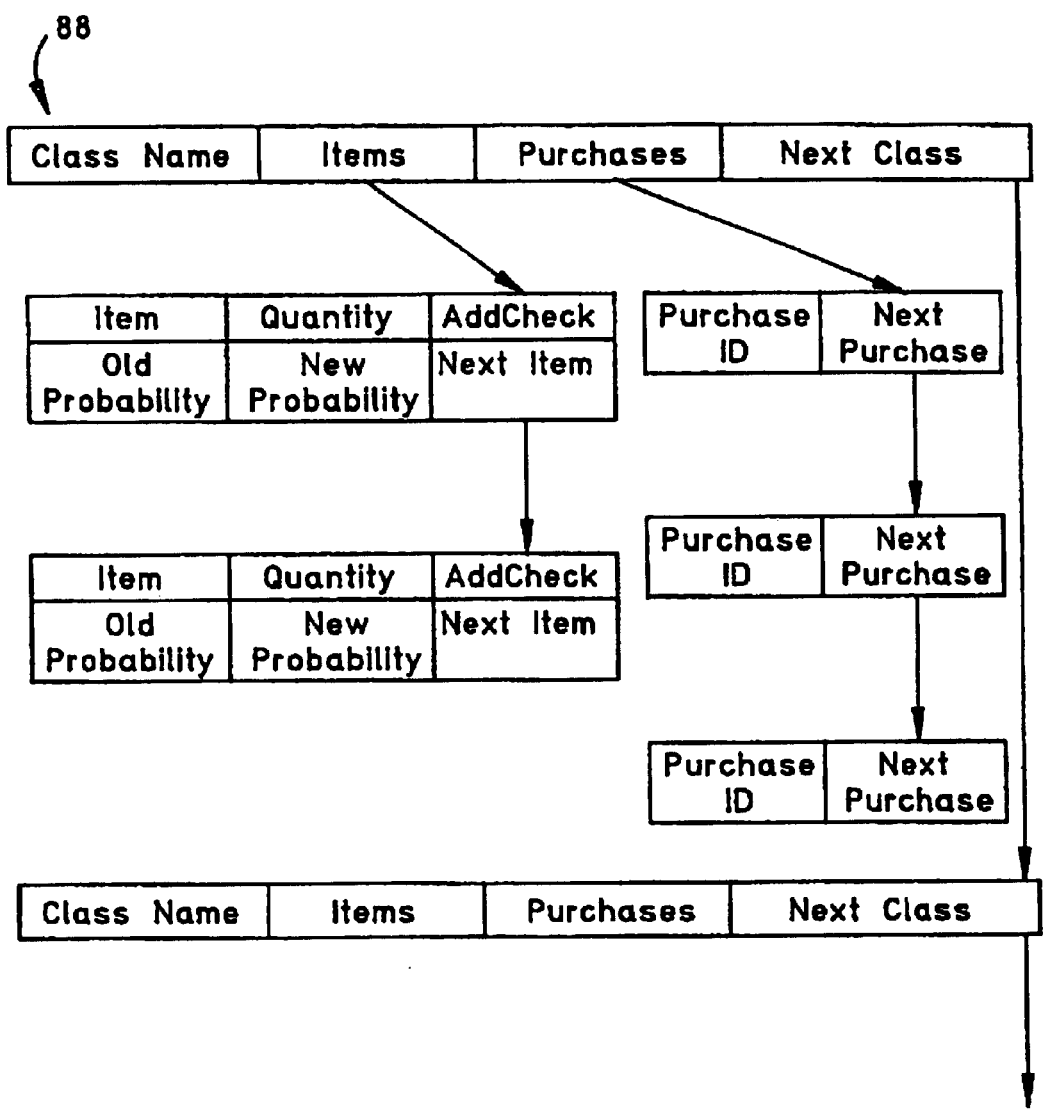
FIG. 5 is a representation of a data structure used by the processor of FIG. 1 to contain class update data.

FIG. 5 is a representation of the data structure referred to as the class update structure 88 that is used to change the items comprising a particular class. The class update structure includes a header record that contains the name of the class to be updated, a pointer to a linked list of items to be a part of the update data, a pointer to a linked list of purchase identification numbers, and a pointer to the next class name in the class update structure. The item linked list contains the item number, quantity purchased, probability of being observed as a member of the class using new data from the purchase transactions currently being considered, the probability of being observed using old data from applicable prior purchase transactions, and a pointer to the next item number in the purchase class. The purchase identification number linked list contains the identification number of a next purchase transaction record and a pointer to the data for the next purchase.

Figure 6:
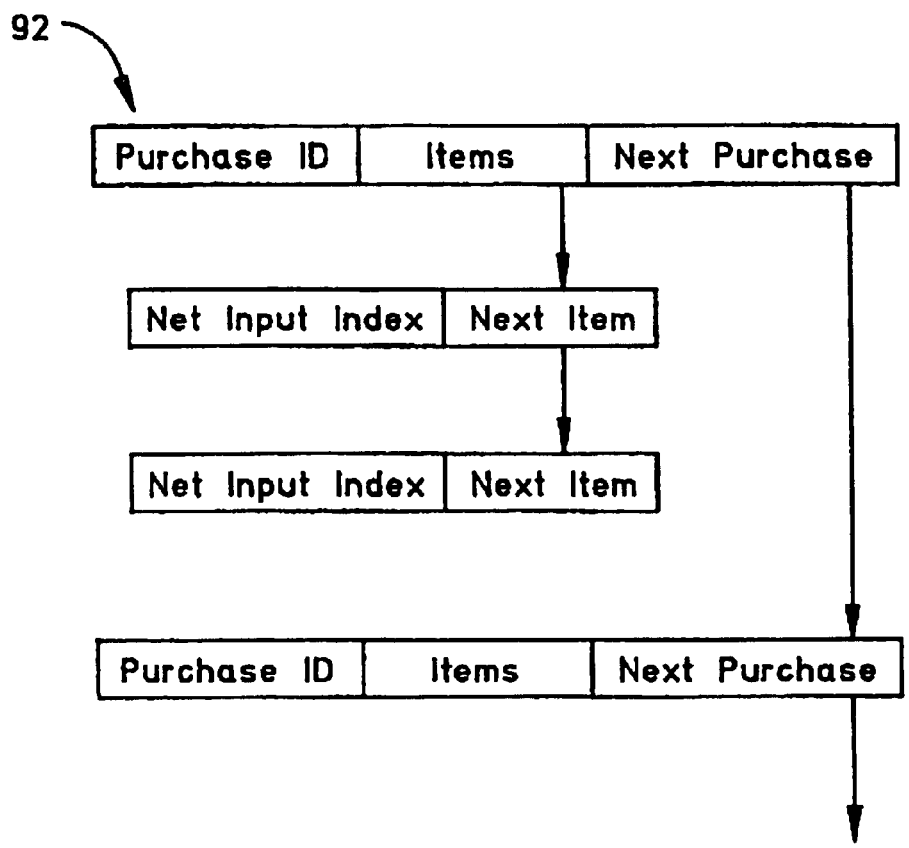
FIG. 6 is a representation of a data structure used by the processor of FIG. 1 to contain class training data.

FIG. 6 is representation of a data structure referred to as the class training file 92 that is used in training each of the neural networks used in determining the class stratification. The class training file contains a header record that contains the purchase identification number of a transaction, a pointer to a linked list of purchase items, and a pointer to the next purchase data record in the class training file. The item linked list contains the network input index number referred to above in connection with the class definition file.

Figure 7:
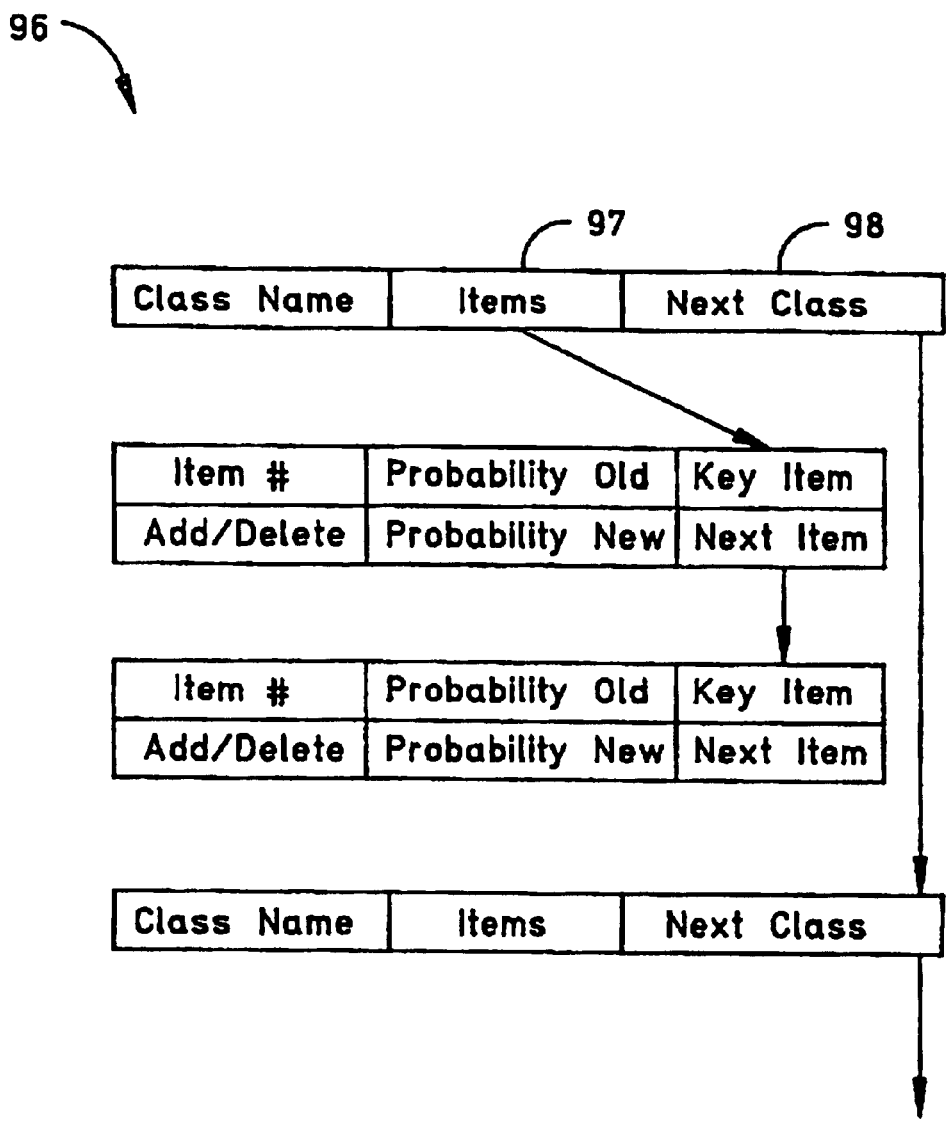
FIG. 7 is a representation of a data structure used by the processor of FIG. 1 to contain data relating to class changes during a training process.

FIG. 7 is a representation of a data structure referred to as a class change history file 96. The class change history file is a data structure that is used to keep track of the changes in the items that make up a purchase class for a store location with respect to class changes that occurred during the training process, which is described further below. The class change history file includes the class name, a pointer 97 to a list of changed key items, and a pointer 98 to the next class change history data record. Each of the item records in the class change history file include the item number, the probability of appearing in an instance of the class using new data, the probability of appearing in an instance of the class using old data, a change flag to indicate addition or deletion of the item from the class, a key number field, and a pointer to the next item in the list.

The data structures described above in connection with FIGS. 3–7 are used by the system 10 in matching purchase items against the purchase class definitions to filter the purchase data through the step represented by box 56 described above in connection with FIG. 2. In the first step of matching items against classes, represented by the flow diagram box numbered 102 in FIG. 8, a temporary copy of the class definition file data structure is created and flags are initialized. The class definition file contains all the information regarding the purchase classes, their associated neural networks, threshold values for processing, and the presence of class-defined items in a purchase.

Next, each item in a purchase transaction is checked against each class in the class definition file. This checking process is represented by the FIG. 8 decision boxes numbered 104, 106, and 108. Box 104 represents cycling through each purchase item of a particular purchase transaction for finding a match and box 106 represents comparing the purchase item against each one of the purchase classes. The decision box numbered 108 represents a processing step in which each purchase item is compared against each item member belonging to the purchase class. That is, these flow diagram boxes represent checking each item in a purchase transaction against each member of each purchase class for a match.

As represented by the decision box numbered 110, at each purchase item-class item comparison, a determination is made as to whether the purchase item matches the purchase class item and whether the class item presence flag (illustrated in FIG. 4) has already been set and therefore has a value of "true". If the determination outcome is "true" at this decision box 110, then the purchase item belongs to the purchase class and has not previously been encountered among the purchase items in the current purchase transaction that already have been checked. Therefore, at the box numbered 112 the item presence flag is set in the class record for that item, and the item probability value and key item value are added to their respective fields in the class definition data structure.

For a given class, the item probability value for a purchase item is the probability of that item appearing in a set of purchase items in a purchase transaction when compared to all members of the class. It is used to initially set up or modify class membership prior to training. For example, if the purchase class of "home maintenance" includes, among other items, a mop, then the item probability value for a mop with respect to the class is the probability that in training, each time a sufficient number of members were found to indicate the "home maintenance" class was applicable, as indicated by the threshold, a mop was present in the purchase. In this way, the probability is an indication of the likelihood that the item will be purchased. Thus, probability is a historical indicator of an item presence when looking at a purchase using the finite list of a class, and serves to indicate that the associated net for that class should be used.

A key item is defined to be an item that has special significance or weight in identifying a class. For example, a key item for the class of "home maintenance" might be a mop. If a mop is a key item, then the key item flag, probability value, and presence flag for the class member "mop" will all be calculated or set, as appropriate, for the "home maintenance" class in a purchase transaction data record of the class identification file if a mop is one of the purchase items. If the purchase item does not belong to the class and the item has not been previously encountered, a "false" outcome at the decision box numbered 110, then processing continues so that the purchase item is checked against the next class item at the decision box numbered 108.

When a purchase item has been checked against all members of a class, meaning the box 108–110 processing loop is done, processing from the decision box numbered 108 follows the flow line labeled "done" back to the input of the decision box numbered 106 to check the purchase item against the members of the next purchase class. When the purchase item has been checked against all of the purchase classes, meaning that the box 106–110 loop is done, processing follows the loop labeled "done" from the decision box numbered 106 and returns to the input of the decision box numbered 104. When all purchase items from a purchase transaction have been checked against all members of all purchase classes, the purchase items have all been identified as belonging or not belonging to one of the purchase classes and the data values necessary for further processing have been calculated. That is, the computer system processing follows the loop labeled "done" from box 104 to the next processing box, which is the decision box numbered 114, to carry out further analysis on the purchase items that have been segmented into one of the purchase classes.

Figure 8:
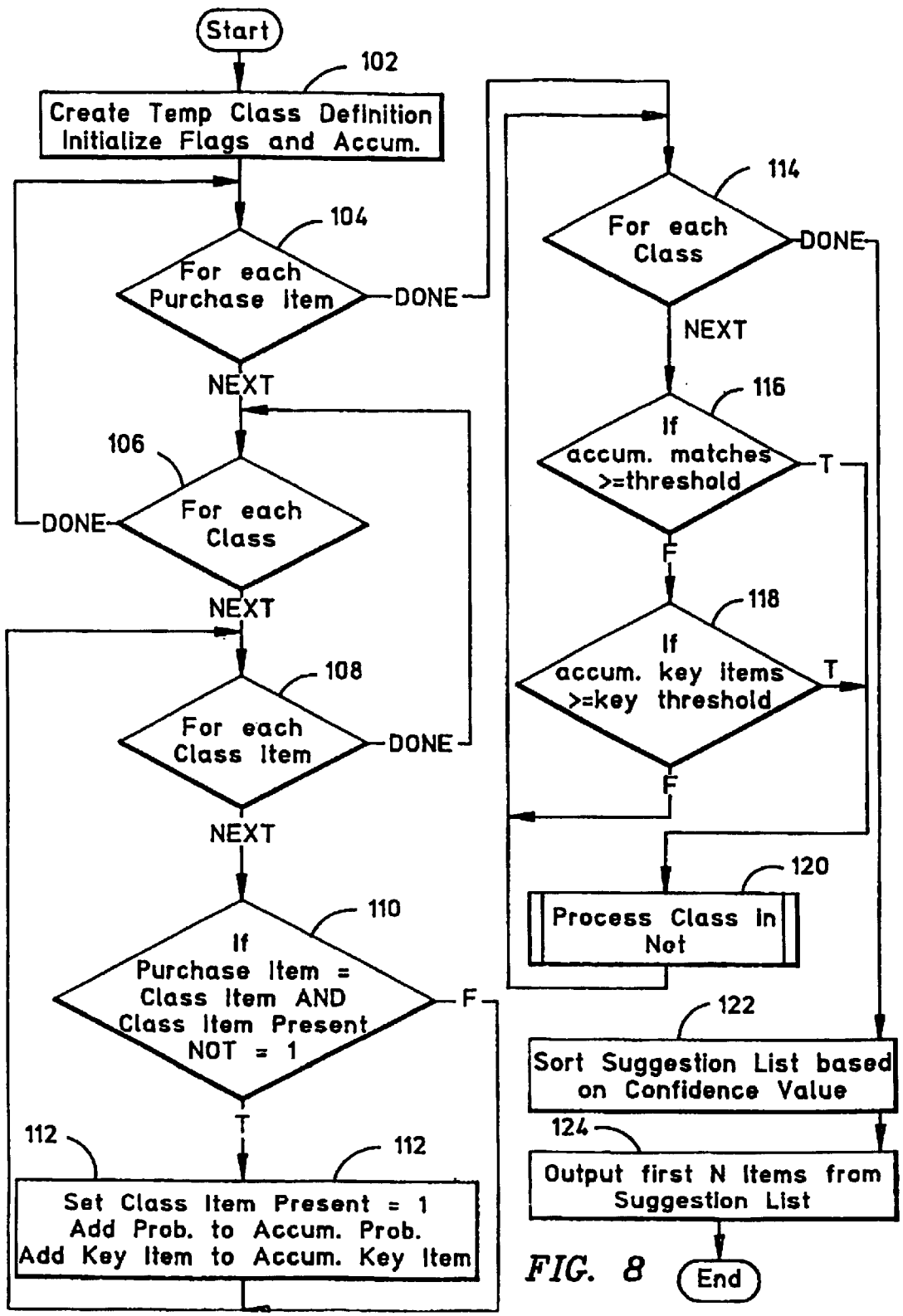
FIG. 8 is a flow diagram representation of the processing steps carried out by the system of FIG. 1 in matching a purchase against class definitions.

The group of processing steps in FIG. 8 beginning with box 114 implement the determination of classes associated with sufficient purchase items to warrant further analysis. Such is the case when the accumulated item probability of a purchase item for a given class meets a predetermined threshold for that class, or if the number of key items in a purchase exceeds a threshold value to warrant indicating the presence of the class in the class identification file. Thus, the decision boxes numbered 116 and 118 indicate that a class applies to a purchase transaction if either the accumulated item probability value is greater than the probability threshold or if the accumulated number of purchase items that were key items for the class exceeds the key item threshold.

If the accumulated item probability of a purchase is high, it indicates that the confidence that a class applies to the purchase is sufficient to warrant using the net. That is, the class is significant.

If a class is deemed significant, then the "key item" data substructure 84 of the class definition file, created for that class and containing class items and their observed presence, is provided as input into the purchase advisor neural network for that class. This neural network input providing step is represented in the FIG. 8 flow diagram by the flow diagram box numbered 120. After all of the significant classes have been processed by the respective neural networks, the outcome at the decision box numbered 114 is "done" and processing proceeds to a sorting step represented by the flow diagram box numbered 122, in which the set of purchase recommendations produced by the neural networks are sorted into a list based on a confidence value also output by the neural networks. In the preferred embodiment, represented by the flow diagram box numbered 124, a predetermined number N of the purchase recommendations having the highest confidence values are produced as output. For example, the five purchase recommendations with the greatest confidence values could be provided to a sales clerk for suggestion. It should be clear that the sorting could be based on other measures, such as absolute value, a normalized value, or other sorting scheme, without departing from the spirit and scope of the invention.

Figure 9:
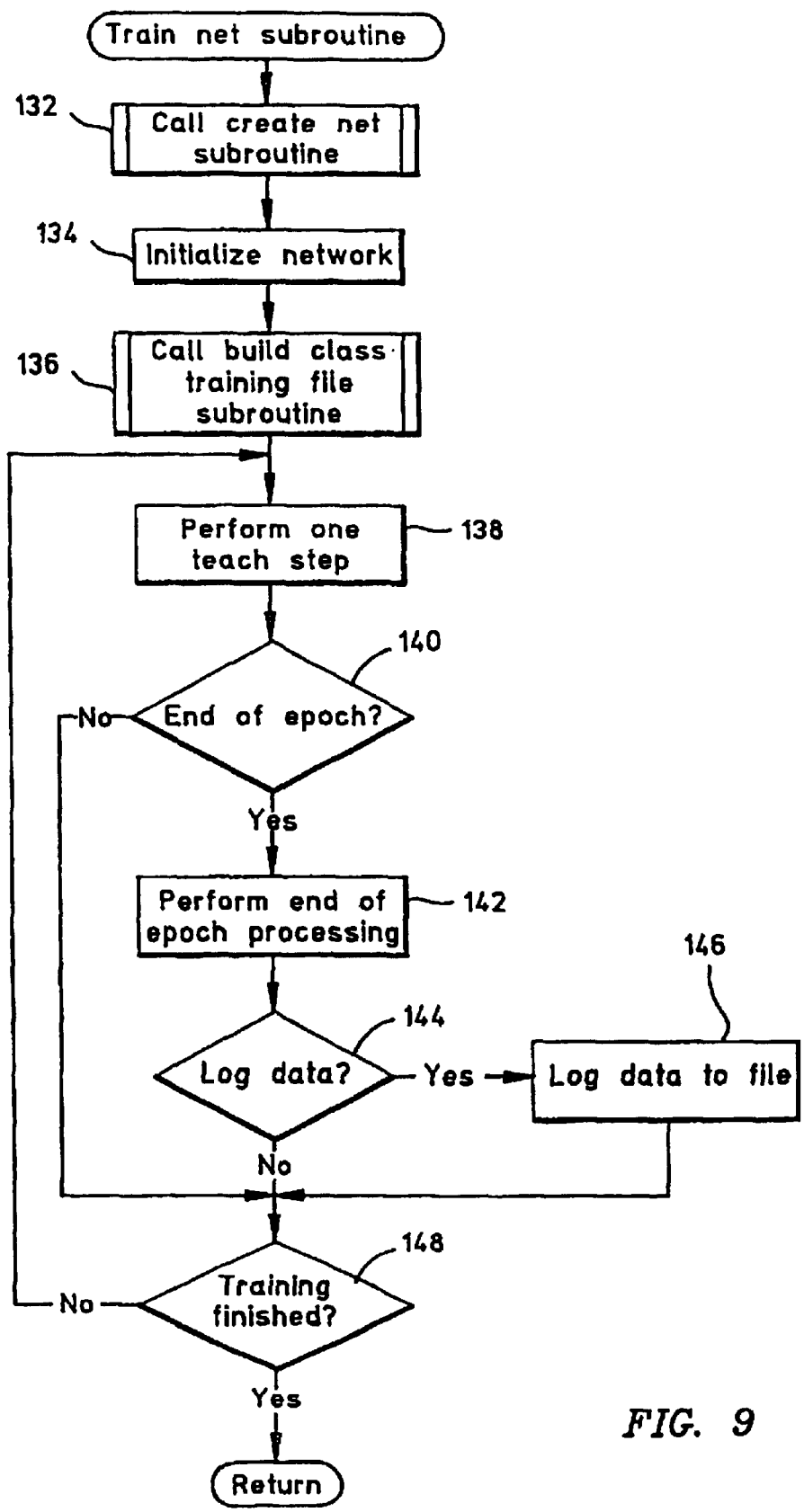
FIG. 9 is a flow diagram representation of the processing steps carried out by the system of FIG. 1 in training a neural network for a single purchase class.
Figure 13:
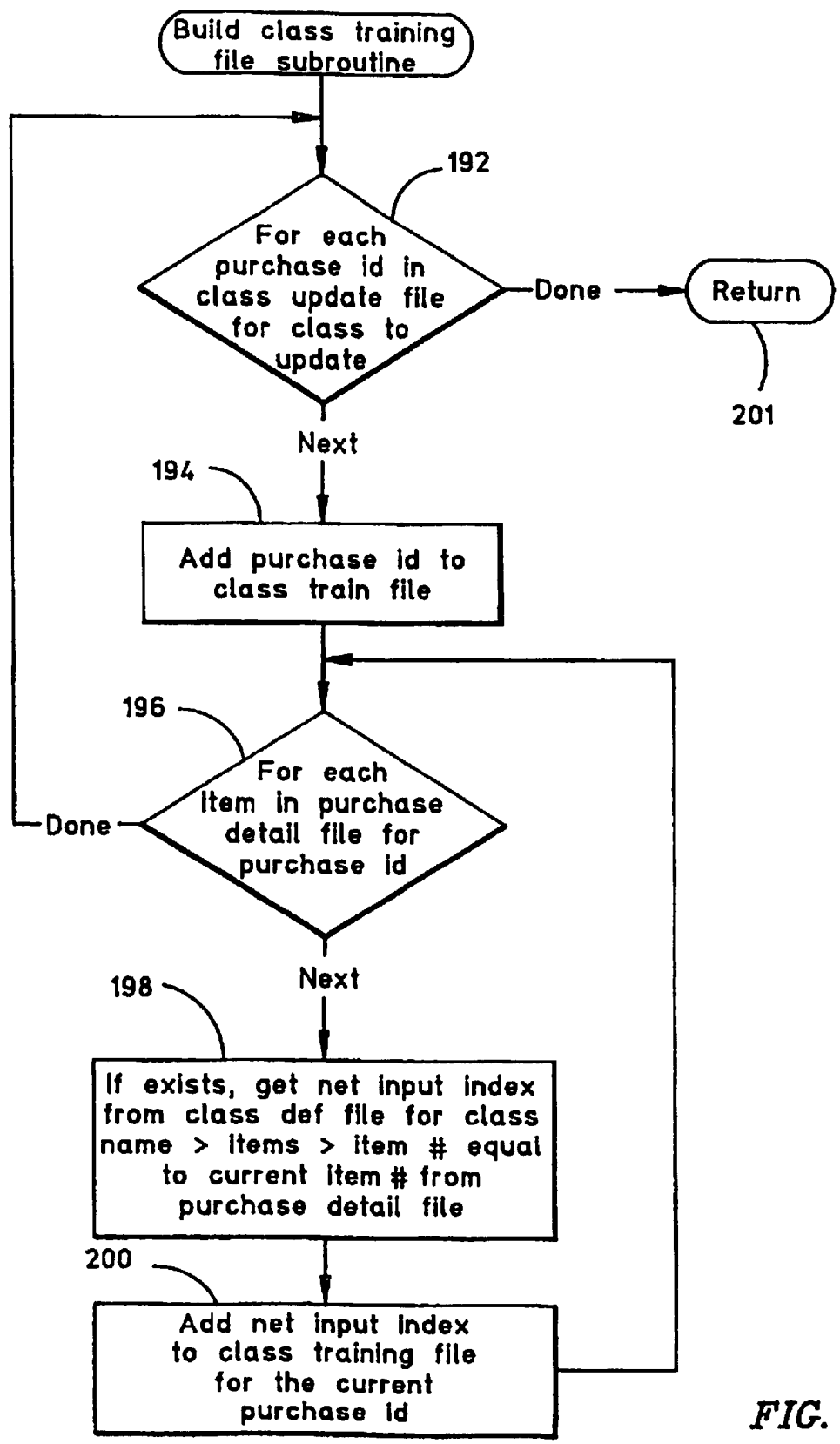
FIG. 13 is a flow diagram representation of the processing steps carried out by the system of FIG. 1 in creating a training data file for a purchase class.

FIG. 9 represents the processing steps followed in training a neural network for one class of items. The steps are followed both for the initial training of a class neural network and for the retraining of the neural network with updated data. In the first step, represented by the flow diagram box numbered 132, the network itself is created. That is, the memory space for containing the data structures is reserved in the memory unit of the computer system. The network creation step is described further below (in connection with FIG. 11). In the next step, represented by the box numbered 134, the network values are initialized. This comprises, for example, initializing the connection weight matrices to random values. Next, at box 136, the processor calls a training file subroutine that creates a set of training data, as described further below (FIG. 13).

After the training data is created, the next step is to perform a teaching session, as indicated by the flow diagram box numbered 138. A complete training session, comprising all of the purchase transaction records in the class training file, is referred to as a training epoch. At the decision box numbered 140, the system tests for the end of the training epoch. If this epoch is ended, an affirmative response, then the processing proceeds to the flow diagram box numbered 142, where end of epoch processing is carried out. Such processing includes modifying the connection matrices in a manner well-known to those skilled in the art. After the end of epoch processing, the system checks to determine if the data should be logged into the system history files, as represented by the decision box numbered 144. If the data should be logged, an affirmative response, then at the flow diagram box numbered 146 the data is logged into the appropriate data files.

Processing resumes with a check for the end of training at the decision box numbered 148. If the previous check at the flow diagram box numbered 140 for the end of the epoch was negative, then processing would have proceeded directly to the check for the end of training at the decision box numbered 148. If the last record from the class training file has been processed, then the training routine is ended. If training has not ended, a negative response at the decision box numbered 148, then processing loops back to the performance of a teaching step, as indicated by the flow diagram box numbered 138.

Figure 10:
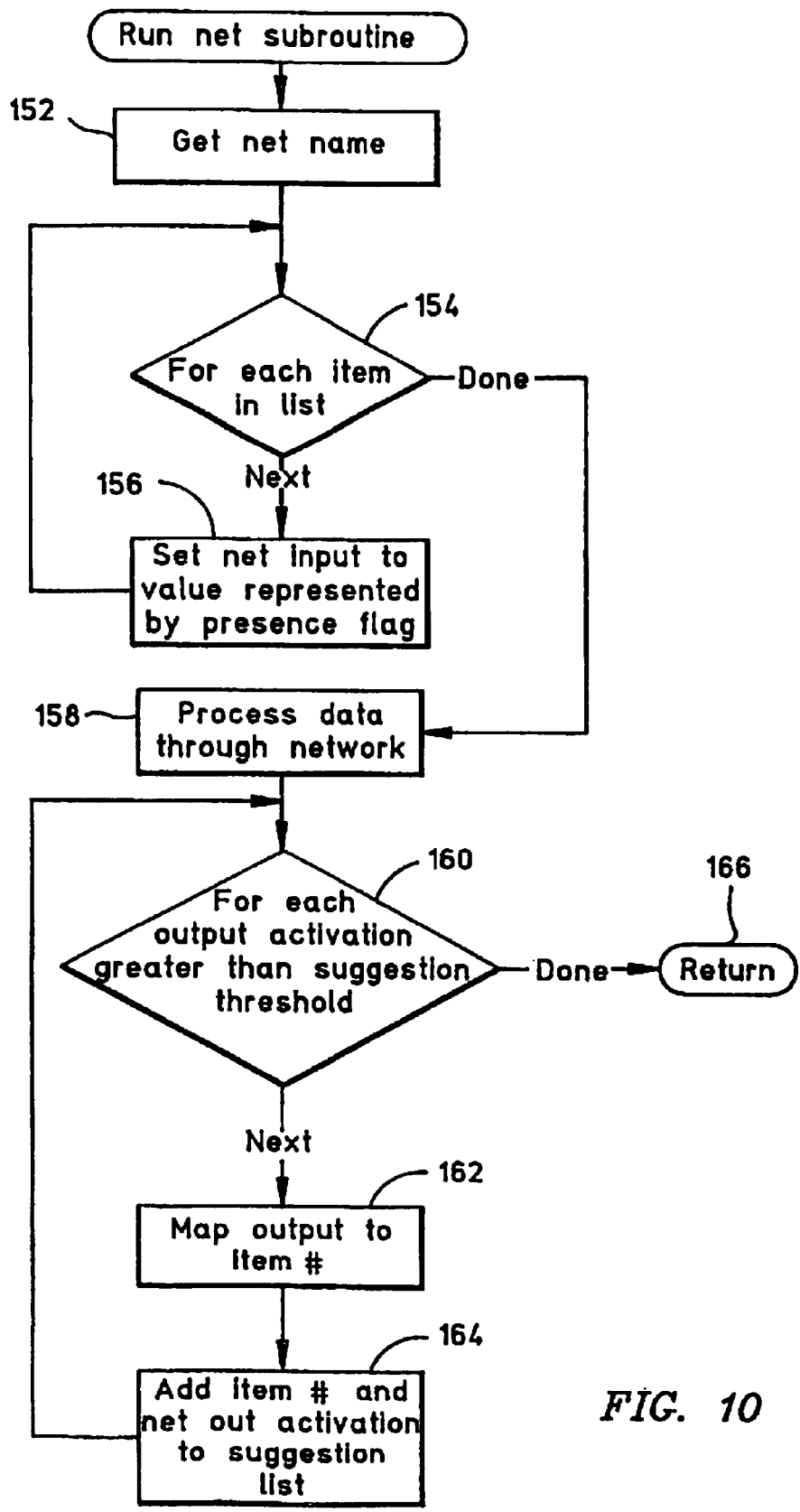
FIG. 10 is a flow diagram representation of the processing steps carried out by the system of FIG. 1 in processing purchase data for a purchase class.

After a neural network is trained, the network can be used to process current purchase data as actual purchases occur in real time. The steps followed in processing current purchase data are illustrated in FIG. 10. The first step in processing purchase data, represented by the flow diagram box numbered 152, is to obtain the correct neural network. That is, each class of goods has a different neural network provided by a neural network program that is called by the CPU. Next, represented by the decision box numbered 154, each item in the list of purchase items is processed. As indicated by the flow diagram box numbered 156, the network input is set equal to a value represented by the item presence flag. The input processing is continued for each item in the list, as represented by the processing loop return back to box 154, until all of the items in the purchase list have been processed. When all items have been processed, the system processing follows the output of the decision box labeled "done" to the flow diagram box numbered 158, where the data is processed through the neural network. That is, the purchase item list is processed through the purchase advisor neural network for the network class under consideration. Processing through the neural network comprises applying the various mathematical formulas representing the network to the class items, as is well-known to those skilled in the art.

At the decision box numbered 160, the system compares the output values from the neural network for the class with a predetermined suggestion threshold for that class. If the output value is greater than the threshold value, then the output index number is mapped to the item number as represented by the flow diagram box numbered 162. Next, the item number and the network output value are placed in a suggested items file, as represented by the flow diagram box numbered 164. Processing then returns to the decision box numbered 160 for checking the predetermined suggestion threshold values. When all output values have been checked, the "done" output form the decision box, processing or the network is ended and processing returns to the CPU at box 166.

In this way, the network performs a data reconstruction function. That is, when presented with an incomplete input or an input with "noisy" data, the network attempts to produce a complete, filtered output. In the context of the suggested purchase system, the attempt to produce a complete output is the process of completing a set of otherwise incomplete purchase items for a defined purchase class.

The steps followed in training the network will next be discussed in greater detail. Those skilled in the art will appreciate that several different network models can be used for the training process. In the preferred embodiment, a feed-forward, backward propagating network, such as those commonly known to those skilled in the art, is used. A separate neural network is provided for each product class and each network input corresponds to a purchase item in a class. To represent the data, if an item is present in a purchase, then the corresponding input node value is set equal to 1 and is otherwise set equal to 0. In training the network, the input to the network is equivalent to the desired output value of the network. The process of creating the neural network as represented by the follow diagram box numbered 132 in FIG. 9 is illustrated in greater detail in FIG. 11.

Figure 11:
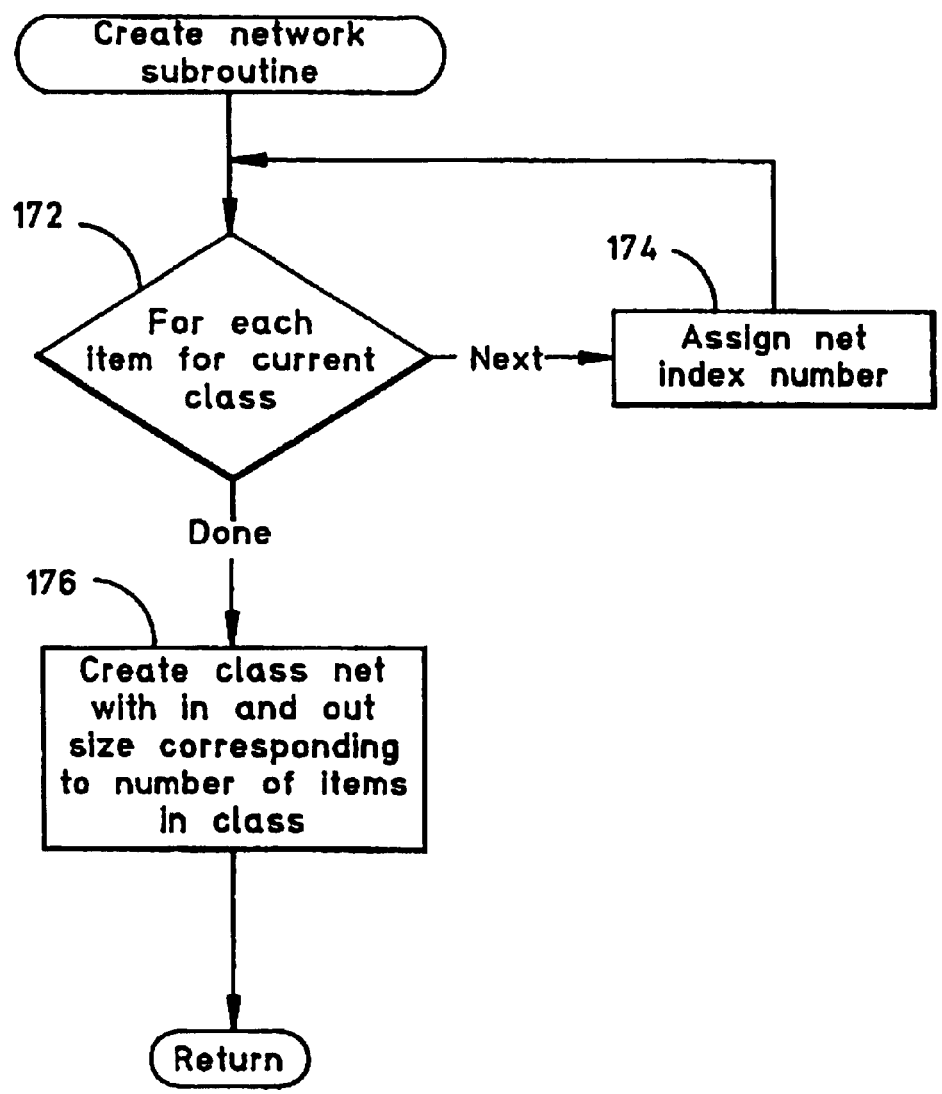
FIG. 11 is a flow diagram representation of the processing steps carried out by the system of FIG. 1 in creating a neural network.

The first step in creating the neural network, as represented by the decision box numbered 172 in FIG. 11, is to assign each purchase item in the purchase detail file (FIG. 3) to a current class. That is, each item is assigned a network input node by assigning each item a network index number. This processing step is represented by the flow diagram box numbered 174. When all of the items in a purchase detail file have been assigned network index numbers, processing proceeds to the flow diagram box numbered 176, where the feed forward network is created. At this processing step, the class neural network is created with the number of inputs and the number of outputs both equal to the number of items in the class. The size of the other neural layers of the neural network are part of the overall network design and do not change. This completes the creation of the neural network and processing then returns to the next step, which is represented by the flow diagram box numbered 134 in FIG. 9.

Figure 12:
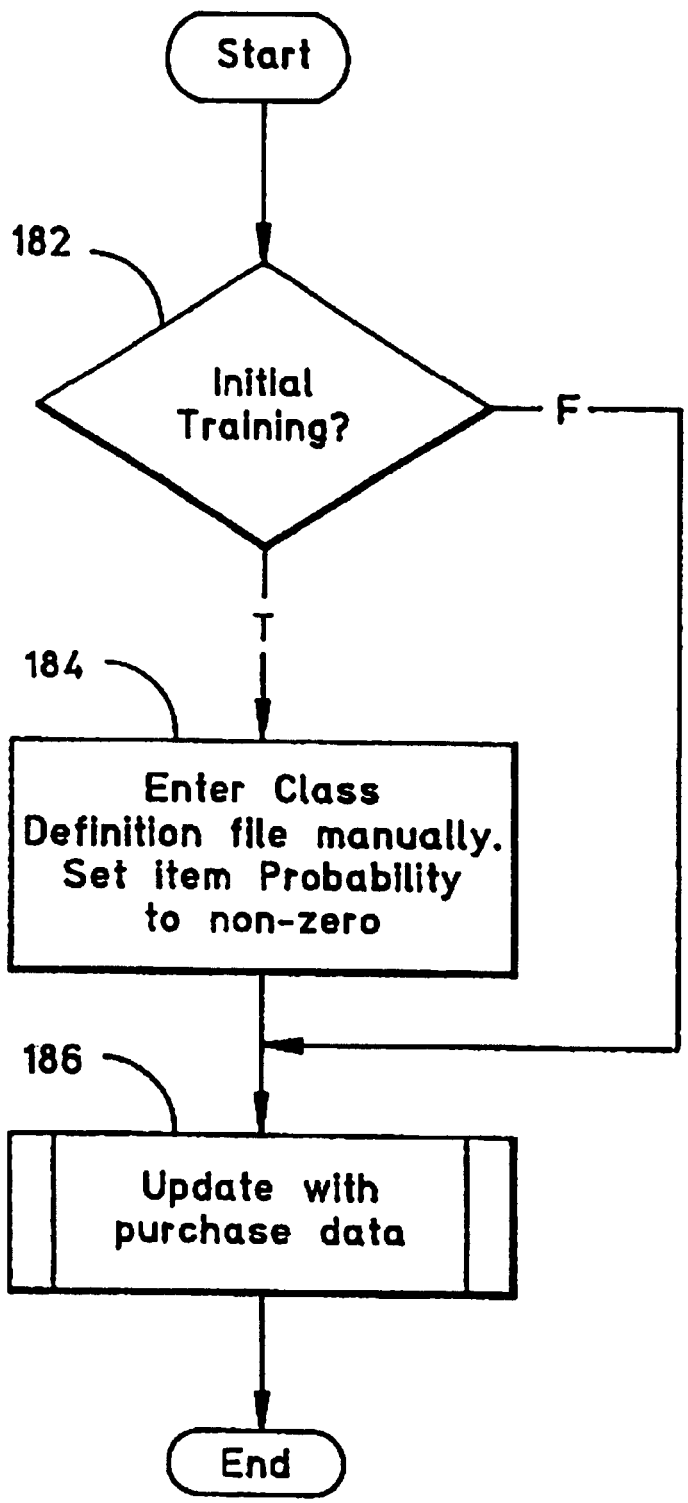
FIG. 12 is a flow diagram representation of the processing steps carried out by the system of FIG. 1 in initially training a neural network of the system.

The next training detail, represented by FIG. 12, is the initial creation of the class definition file, which corresponds to the flow diagram above numbered 134 in FIG. 9. This file is created by the specific processing steps illustrated in FIG. 12 the first time the neural network is trained. Thereafter, the class definition file will be automatically updated. The class definition file is used in creating the class training file, whose processing is described further below. That is, during initial training, sample sets are created. These sets adjust based on historical data over time.

The initial step in the creation of the class definition file, as represented by the decision box numbered 182, is to determine if processing is at the stage of initial training. If the initial training is involved, an affirmative response, then processing proceeds to the flow diagram box numbered 184, where the class item probability is set to a randomly assigned, non-zero number. The non-zero value is necessary for proper processing at the change analysis step, described further below. After the class item is created for the class definition file, an automatic update process is immediately performed, as represented by the flow diagram box numbered 186. If the initial training was not involved, a false outcome at the decision box numbered 182, then the class definition file initialization step is skipped and the update is immediately performed. The completion of the automatic update ends the initial training processing.

FIG. 13 shows the processing steps involved in creating the class training file from the class update file and class definition file, which corresponds to the processing represented by the flow diagram box numbered 136 in FIG. 9. The class training file data structure is built from the set of purchase identification numbers associated with the class in the class update file. Thus, the processing of FIG. 13 cycles through each one of the purchase items in a purchase transaction of the class update file, as represented by the decision box numbered 192. That is, each item has a purchase identification number, which is added to the class training file. This step is represented by the flow diagram box numbered 194. Next, the item numbers in a purchase transaction are retrieved from the purchase detail file previously created using the purchase identification number, as represented by the decision box numbered 196.

At the flow diagram box numbered 198, the network input index number is retrieved from the class definition file for the class of which the item is a member if the item number of the present item is equal to the current item number retrieved from the purchase detail file. Next, the network input index number is added to the class training file item linked list for the current purchase identification number, as represented by the flow diagram box numbered 200. Processing then returns to the decision box numbered 196 to obtain data regarding the next item number. When all of the items in the purchase transaction have been processed, processing follows the loop from box 196 labeled "done" up to the initial decision box numbered 192 for the next purchase transaction record. When all of the purchase identification numbers have been processed at box 192, the creation of the class training file is complete and processing ends, as indicated by the box numbered 201.

Figure 14:
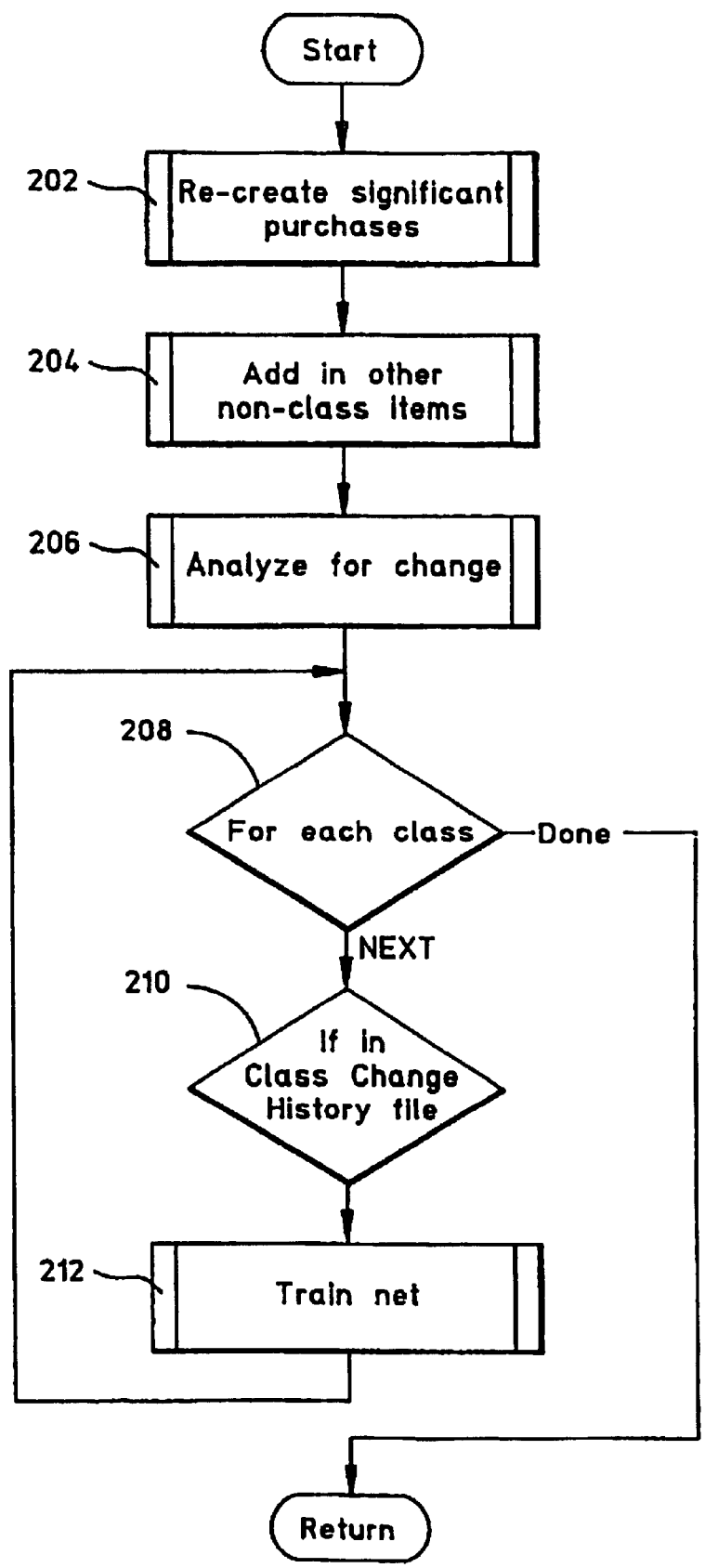
FIG. 14 is a flow diagram representation of the processing steps carried out by the system of FIG. 1 in updating purchase class definitions and retraining based on updated purchase data.
Figure 15:
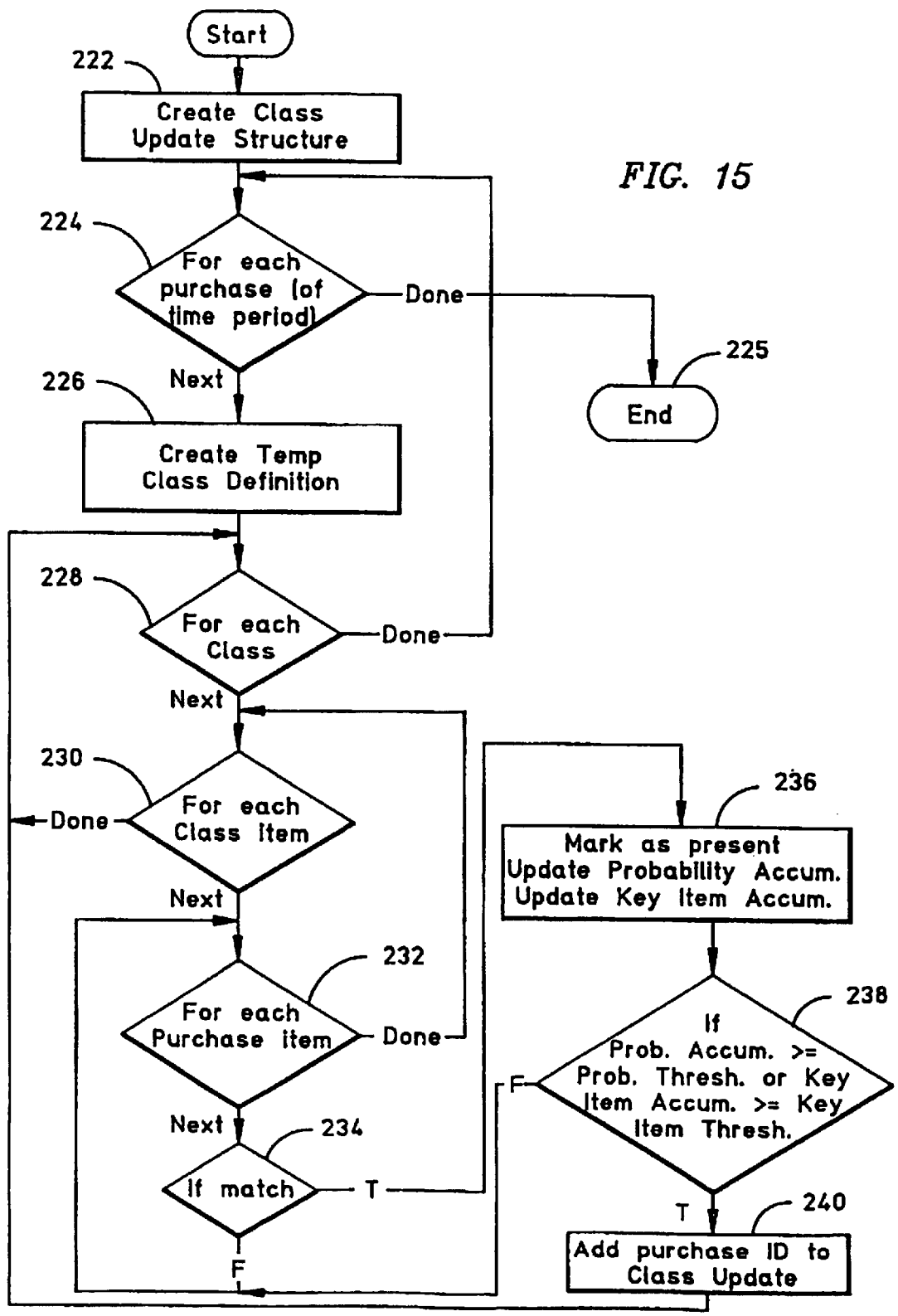
FIG. 15 is a flow diagram representation of the processing steps involved in the re-creating purchase step illustrated in FIG. 14.
Figure 16:
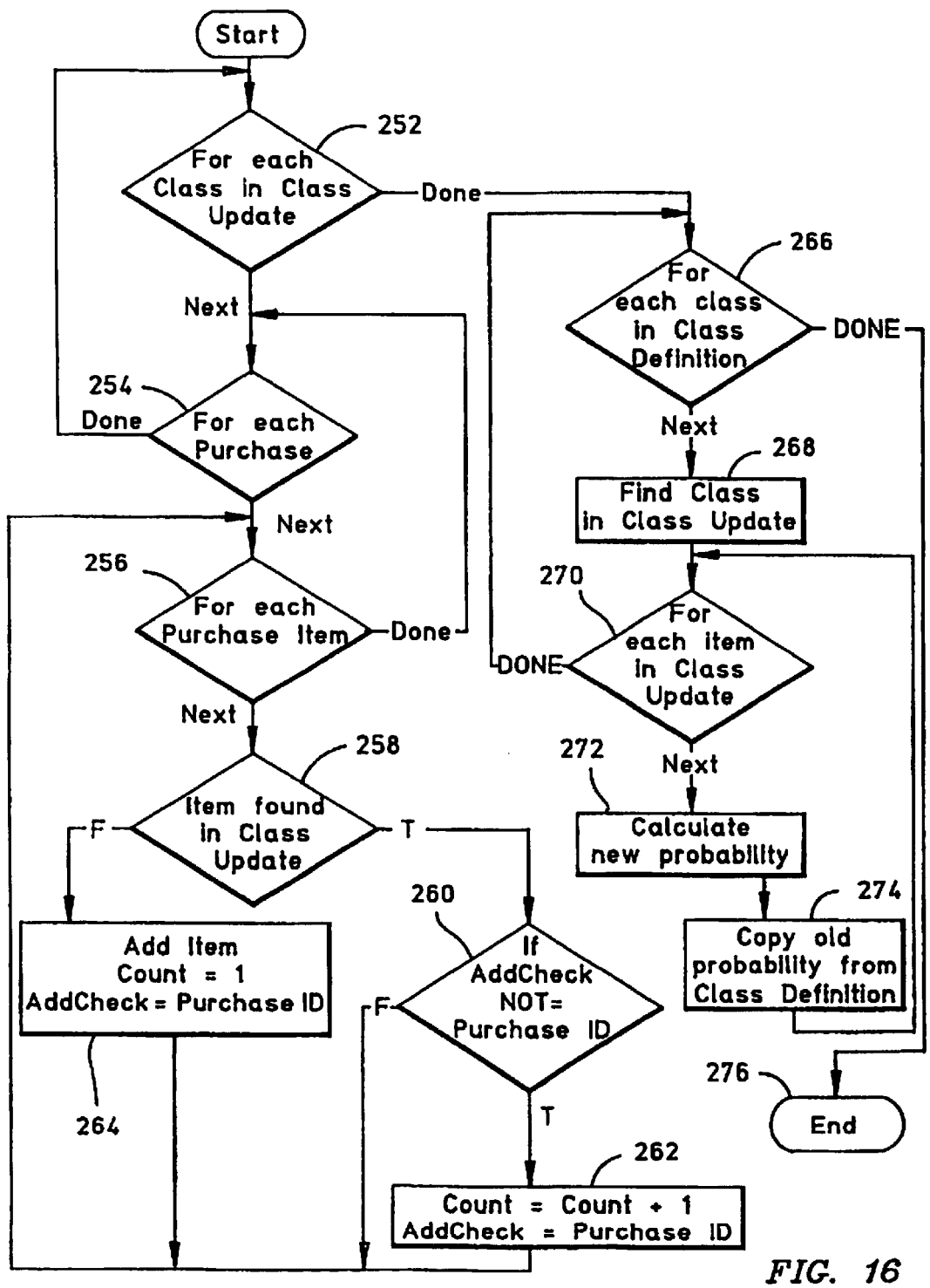
FIG. 16 is a flow diagram representation of the processing steps involved in the addition of classes step illustrated in FIG. 14.

FIG. 14 illustrates the processing carried out in updating class descriptions and retraining the purchase advisor neural network and the neural network for each class. Such updating is carried out based upon the purchase information that has occurred since the time of the last update processing or some other predetermined time interval, such as monthly or according to shopping seasons. The processing entails the steps represented by the box numbered 186 in FIG. 12. The first step, represented by the flow diagram box numbered 202 in FIG. 14, is to build the class update structure data file using stored purchase data, which processing is described in greater detail below (FIG. 15). This processing recreates the significant purchases that have occurred, such that the class update structure contains a list of all purchases that are deemed significant for each class. The next step, represented by the flow diagram numbered 204, is to add in all other items purchased at the same time as the class specific items organized into the class update structure (FIG. 16). Included in this step 204 is the calculation of statistics relating to the frequency with which the non-class items were purchased. For example, if it is determined that the class "party food" includes chips and dipping sauces, this processing step adds back into the data the fact that a seemingly unrelated item, such as peanut butter, also was purchased.

The next step, indicated by the flow diagram box numbered 206, is to compare the previous customer purchase habits as a class with the current purchase habits of a customer for all items. This comparison (described in further detail in FIG. 17) shows if there are any items with sufficient significance to be added to the particular class definition. If so, the class definition file is updated, as described further below. If any updates are made, then class change history file is flagged. Next, each class is checked for updating, as represented by the decision box numbered 208. In particular, an entry in the class change history file is noted at the box numbered 210, which is followed by a training of the neural network, as represented by the flow diagram box numbered 212 (represented in greater detail by FIG. 9). After the training for a class, processing returns to checking the next class at the decision box numbered 208. When all classes have been checked, the update processing is completed.

FIG. 15 illustrates the processing steps involved in carrying out the building of the class update structure, which was represented by the single flow diagram box numbered 202 in FIG. 14. The first step of the data building process, represented by the flow diagram box numbered 222 in FIG. 15, is to create the class update structure. This is the data structure that will be filled in using historic purchase data so as to contain a list of significant purchases for each class. The next step is to cycle through each purchase with in the relevant time period, as represented by the decision box numbered 224. For each purchase, a temporary copy of the class definition file is created, as indicated at the flow diagram box numbered 226. When all purchases have been cycled through, the processing ends, as indicated at the flow diagram box numbered 225.

Next, processing proceeds through each class in the temporary class definition file, represented by the decision box numbered 228. Within each class, the processing next cycles through each class item, as represented by the decision box numbered 230. Further, the processing cycles through each item within a purchase transaction, as represented by the decision box numbered 232. For each one of the items, a comparison is made to determine if the item is a member of the particular class in the temporary class definition file, as represented by the decision box numbered 234. If there is a match, then processing next moves to the flow diagram box numbered 236, where the accumulation threshold totals are increased. That is, the presence flag is set, the probability accumulation is updated, and the key item accumulation data is updated.

Next, as represented by the decision box numbered 238, the threshold values for the probability accumulation data and the key item accumulation data, respectively, are tested. If the accumulated data are greater than the threshold value for either data item, an affirmative response at the decision box 238, then the purchase identification number is added to the class update structure at the flow diagram box numbered 240. If the probability thresholds are not exceeded, a negative outcome at the decision box 238, then processing returns to examine the next purchase item in the purchase transaction back at the decision box numbered 232. After all of the purchase transactions in the relevant time period have been processed, an outcome of "done" at the decision box numbered 224, the processing for the creation of the class update structure is finished (box 225) and processing resumes with the flow diagram box numbered 204 in FIG. 14.

FIG. 16 is a representation of the processing steps followed in performing the completion of the class update structure as represented by the flow diagram box numbered 204 in FIG. 14. The processing cycles through each class in the class update structure, as represented by the decision box numbered 252 in FIG. 16. The decision boxes numbered 254 and 256 indicate that processing also cycles through each purchase (box 254) and each purchase item (box 256) to examine whether a purchase item is found in the class update structure, as represented by the decision box numbered 258. Because it is important to know if a purchase item was purchased in a class set, but it is not important to know how many items within a specific purchase were in the set, an add flag, identified as "AddCheck" in FIG. 16, is used to insure that a purchase identification number is counted only once per purchase. Thus, if an item is found in the class update structure, an affirmative outcome at the decision box numbered 258, then at the decision box numbered 260, a check is made to determine if the AddCheck flag has not yet been set. If it has not been set, an affirmative response at the decision box 260, then at the flow diagram box numbered 262 the count of items purchased is incremented and the add check flag is set equal to the purchase identification number. The processing then returns to the decision box numbered 256 to process the next purchase item. If the item was not found in the class update structure, a negative outcome at the decision box numbered 258, then at the flow diagram box numbered 264 the item is added to the class update structure, the count of that item is initialized to the value one, and the AddCheck flag is set equal to the purchase identification number of the item. Processing then returns to the decision box numbered 256 to process the next purchase item.

After processing has cycled through all of the classes in the class update structure, an outcome of "done" at the decision box numbered 252, then processing proceeds to examine each class in the class definition file, as indicated by the decision box numbered 266. The flow diagram box numbered 268 indicates that the proper data record in the class update structure is located for the purchase class under consideration and the decision box numbered 270 indicates that processing cycles through each item within the class update structure. For each item in the class update structure, the flow diagram box numbered 272 indicates that new probability of the item being within the class is calculated and the flow diagram box numbered 274 indicates that the old probability is copied from the class definition file. Processing then returns to the decision box numbered 270 for consideration of the next item in the class update structure.

If all of the items within a class of the class update structure have been considered, then processing moves from the decision box numbered 270 to the decision box numbered 266. When processing has cycled through all of the classes in the class definition file, an outcome of "done" at the decision box numbered 266, then the processing for the non-class items is completed, as represented by the box numbered 276, and processing proceeds to the change analysis step indicated by the flow diagram box numbered 206 in FIG. 14.

Figure 17:
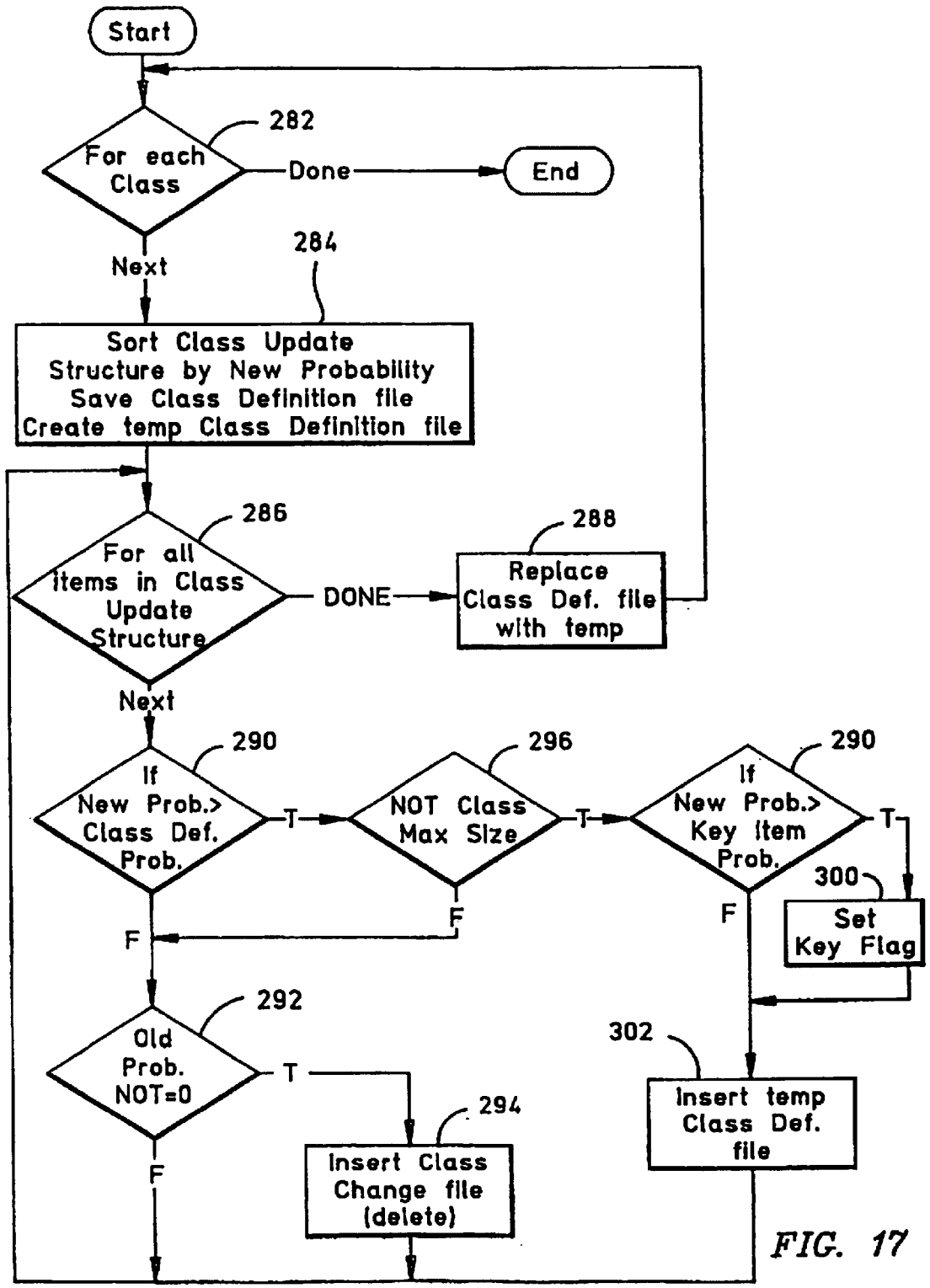
FIG. 17 is a flow diagram representation of the processing steps carried out by the system of FIG. 1 in analyzing recent purchases to update the class definitions.

FIG. 17 illustrates the processing used in carrying out the change analysis step represented by box 206 of FIG. 14. The change analysis processing cycles through each class of the class update structure, as represented by the decision box numbered 282 in FIG. 17. The class update structure contains all items purchased when a class was identified as being relevant to a purchase. Next, for each one of the classes, the class update structure is sorted by the new probability values previously calculated (see FIG. 16), as represented by the flow diagram box numbered 284. The flow diagram box numbered 284 indicates that the class definition file also is saved and a temporary class definition file is created. The decision box numbered 286 indicates that processing cycles through all of the purchase items in the class update structure.

When processing for all of the items in the class update structure is completed, an outcome of "done" from the decision box numbered 286, then processing moves to replacing the class definition file with the temporary class definition file, as indicated by the flow diagram box numbered 288. Processing then proceeds to the next class, at the decision box numbered 282.

Processing for each item in the class update structure proceeds from the decision box numbered 286 to the decision box numbered 290, at which a check is performed to determined if the new calculated probability for the item is greater than a predetermined class definition probability threshold. If the probability is not greater, a negative outcome at the decision box numbered 290, then processing moves to the decision box numbered 292, where a check is made to determine if the old probability value was non-zero. If the value was non-zero, then processing moves to the flow diagram box numbered 294, where the item is deleted from the class and the class change file is flagged. Processing then returns to the decision box numbered 286 to process the next item. If the old probability was equal to zero at the decision box numbered 292, then processing returns directly to the next item at the decision box numbered 286 and the insertion of a deletion change is skipped.

At the decision box 290, if the new probability was greater than the class definition class probability threshold, then processing next moves to the decision box numbered 296 for a check against the number of items in the class reaching a predetermined maximum size. If the maximum size is reached, then processing moves to the decision box numbered 292, where the old probability is checked for a non-zero value. If the maximum class size has not been reached, then processing moves to the decision box numbered 298, where the new probability for the item is tested against a predetermined key item threshold value. If the new probability value is greater than the key item threshold value, then a key item flag is set, as represented by the flow diagram box numbered 300. Processing then moves to the flow diagram box numbered 302, where the new probability is inserted into the temporary class definition file. If the new probability is not greater than the key item threshold value, a false outcome at the decision box numbered 298, then processing proceeds directly to inserting the new probability into the temporary class definition file at box 302, bypassing the setting of the key item flag. From the flow diagram box numbered 302, processing returns to the decision box numbered 286 for cycling through the next item in the class update structure.

It can be advantageous to select sales promotions independently of items purchased by a particular customer during a particular in-store visit. For example, such sales promotions could be calculated to arouse a customer's interest into making a visit to the store, thereby capturing additional purchases that otherwise might not have occurred. In addition, it sometimes can be more effective to make a purchase suggestion before the beginning of a purchase transaction, rather than during a store visit or at the end of the purchase transaction. Therefore, the system of FIG. 1 preferably includes within the purchase advisor subsystem 24 a demographics prediction subsystem 25 that predicts the customer population that can be expected to be within the store at any one time, based on a variety of factors. The demographics prediction subsystem advantageously uses a customer population neural network that is designed to make predictions of the customers in the store and then to predict purchases that such a customer population would make. The predicted purchases can then be provided as input to the purchase advisor subsystem. Also, the predicted purchase data and the predicted customer population data produced by the demographics prediction subsystem can be used beneficially for other purposes.

Figure 18:
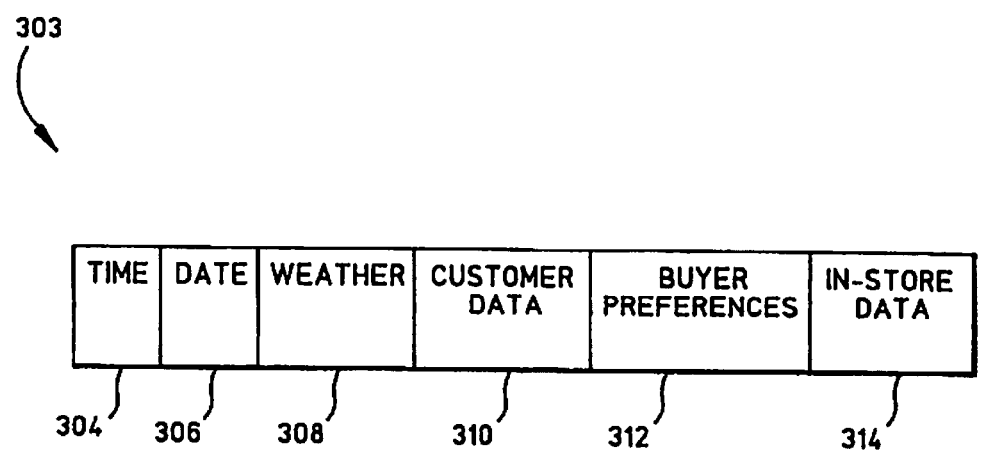
FIG. 18 is a representation of a data structure used by the processor of FIG. 1 in predicting the customer population within a store.

FIG. 18 is a representation of a demographics data structure 303 used by the CPU 18 (FIG. 1) in running the customer population neural network of the demographics prediction subsystem. The demographics data structure is used with the customer population neural network in the same manner that the data structures illustrated in FIGS. 3–7 are used with the purchase class neural networks described above. Although particular data fields 304–314 are illustrated in FIG. 18, it should be understood that each of the fields can represent a linked list or separate data records, as needed for a particular implementation.

The first data field illustrated in the data structure 303 is for the time of day 304. Time of day can be important in predicting customer populations because, for example, buyers with particular characteristics might shop early in the day as opposed to those who shop late in the day or late in the evening. The next data field is for the date 306. The date field permits the system to account for seasonal buying characteristics, holiday variations, and other buyer characteristics associated with the day of the week, month, or year. A weather data field 308 permits the system to further account for seasonal or other weather-related phenomenon. For example, rainy weather likely will result in a customer population favorably disposed to suggestions for purchases of rain gear such as boots, umbrellas, and overcoats, regardless of other purchases made during a store purchase transaction.

Another data field is one for customer data 310, which includes data relating to recent purchases by other customers, spending habits of the local population, economic data, and the like. The next data field is for buyer preference data 312, which comprises item identification numbers of products predicted to be purchased. That is, the buyer preference data preferably contains the neural network output. Finally, the data structure also can include in-store data 314. The in-store data relates to the number of customers presently in the store, the distribution of customers throughout the store, inventory information, in-store traffic data such as generated by proximity sensors, and the like.

Figure 19:
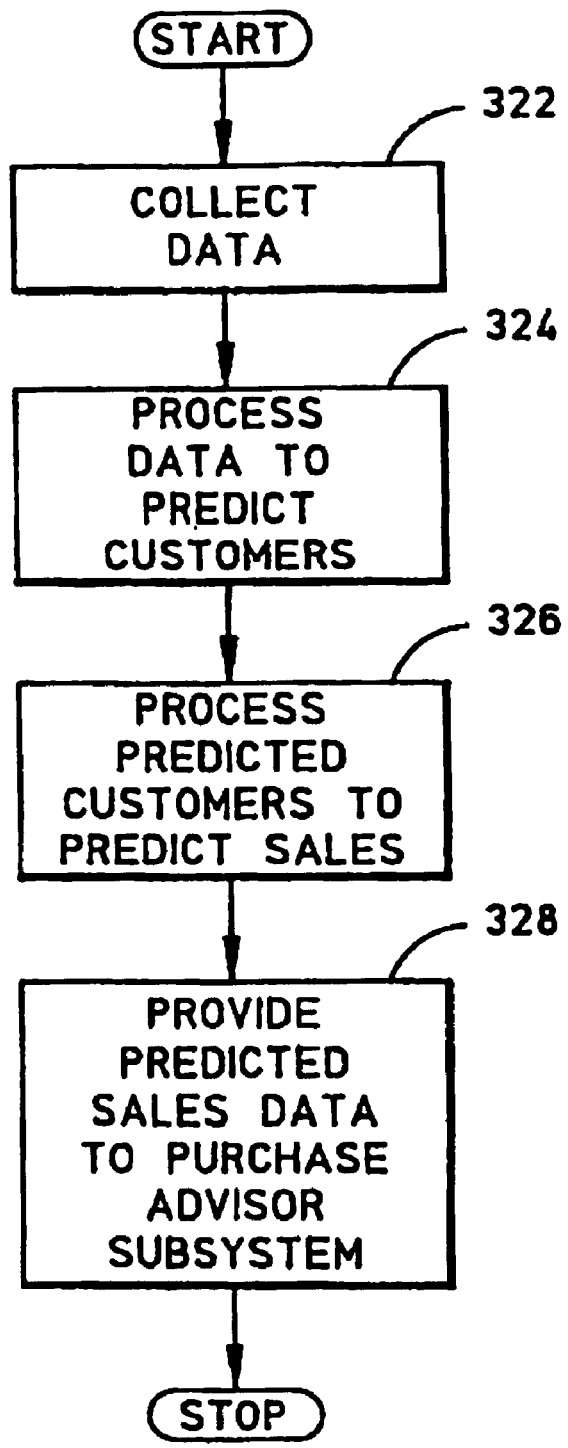
FIG. 19 is a flow diagram representation of the processing steps carried out by the system of FIG. 1 in predicting the customer population within a store and the corresponding purchases of the population.

FIG. 19 is a flow diagram that represents the processing steps followed by the CPU 18 of FIG. 1 in carrying out operation of the demographic prediction subsystem. The first step, represented by the flow diagram box numbered 322, is to collect the data used by the subsystem. Such data comprises the data fields discussed above in conjunction with FIG. 18. The next step, represented by the box numbered 324, is to process the collected data with the demographic neural network to generated output comprising a predicted customer population inside the store at a given time. Next, at box 326, the demographic subsystem processes the predicted customer population with another neural network of the subsystem to generate output comprising predicted purchases. That is, a listing of items that the subsystem predicts would be purchased by a typical customer at the given time.

The next step, represented by the flow diagram box numbered 328, is to provide the predicted sales purchase data to the purchase advisor subsystem and its neural networks. As described above, the purchase advisor subsystem will segment the purchase items into purchase classes and generate selected sales promotions, such as purchase suggestions. Creating purchase suggestions can comprise, for example, the process described at the FIG. 8 flow diagram box numbered 122. The selected sales promotions can be used on the general customer population or for direct mail campaigns and the like, rather than the use described previously of targeting particular customers making purchases.

It should be understood that the output comprising the predicted customer population in the store and the output comprising the predicted purchase transactions can be used independently of any use in the purchase advisor subsystem. That is, it might be useful to a store manager to have a sense of customers that can be expected in a store at any one time, or to have an understanding of what products can reasonably be expected to be purchased at a given time of day. The system 10 provides such flexibility and usefulness.

In addition, the purchase advisor subsystem can be applied to a variety of sales and marketing environments. For example, sales that are made via telephone orders and/or in the telemarketing context can be used with the system 10 to generate recommended purchases.

Thus, a sales promotion selection system has been disclosed that automatically collects purchase transaction data, segments the purchase items of a particular customer purchase transaction into predetermined purchase classes that define groups of items ordinarily purchased together, and identifies items that belong to a purchase class but were missing from the purchase transaction. The system then selects a sales promotion to suggest the purchase of a missing item that likely will result in an additional sale.

The present invention has been described above in terms of a presently preferred embodiment so that an understanding of the present invention can be conveyed. There are, however, many configurations for sales promotion selection systems not specifically described herein but with which the present invention is applicable. The present invention should therefore not be seen as limited to the particular embodiment described herein, but rather, it should be understood that the present invention has wide applicability with respect to sales promotion selection systems generally. All modifications, variations, or equivalent arrangements that are within the scope of the attached claims should therefore be considered to be within the scope of the invention.

What is claimed is:

1. An automated sales promotion selection system comprising:
   an input device that receives customer data relating to purchases of items by customers;
   a computer system including a central processing unit and a storage unit including a purchase advisor neural network and a plurality of item identifiers that identify items available for purchase, wherein the purchase advisor neural network responds to customer data received from the input device by determining if one or more of the item identifiers stored in the storage unit corresponds to an item likely to be purchased by one of the customers and identifies a sales promotion relating to the item, and wherein the central processing unit selectively adapts the response of the purchase advisor neural network for future customers in response to customer data; and an output device that receives the item identifiers of the likely purchases determined by the purchase advisor neural network;

wherein the storage unit further includes a customer demographics neural network that estimates buying characteristics of one or more customers most likely to be at a purchase location, and also produces item identifiers comprising the estimated item purchases of the estimated customers.

2. The automated sales promotion selection system of claim 1, wherein the customer data received by the customer information device includes data relating to a purchase of one or more items that occurred during a current customer visit to a purchase location, and wherein the identified sales promotion comprises a list of items to be suggested for purchase during the current customer visit.

3. The automated sales promotion selection system of claim 1, wherein the central processing unit assigns the items purchased by the customer during the present customer visit into predetermined purchase classes comprising items frequently purchased together, wherein the purchase advisor neural network determines an item likely to be purchased by receiving the purchase class assignments from the central processing unit and identifying as likely to be purchased those items that are members of a purchase class observed to be in a purchase by the customer but are missing from the items purchased, and wherein the identified sales promotion comprises a listing of at least one of the items determined to be missing from one of the purchase classes to be suggested to the customer for purchase during the current customer visit.

4. The automated sales promotion selection system of claim 3, wherein the central processing unit selectively adapts the response of the purchase advisor neural network by updating at least one predetermined purchase class based upon purchase data from previous customer transactions.

5. The automated sales promotion selection system of claim 1, wherein the central processing unit receives the item identifiers of the estimated purchases from the customer demographics neural network, segments the item identifiers into purchase classes, and provides the purchase advisor neural network with the segmented item identifiers as input; and wherein the purchase advisor neural network responds to the input by determining if one or more of the item identifiers corresponds to an item likely to be purchased by one of the estimated customers.

6. The automated sales promotion selection system of claim 1, wherein the storage unit further includes a neural network training subsystem that collects a set of sales purchase data generated by customer purchases, selects a training epoch subset of the collected sales purchase data, and performs a neural network training process with the selected data, and wherein the neural network training subsystem further repeatedly collects data, selects a training subset, and performs the training process until all neural network training epoch data subsets in the collected sales purchase data have been processed.

7. The automated sales promotion selection system of claim 1, wherein the central processing unit selectively adapts the response of the purchase advisor neural network by retraining the purchase advisor neural network with purchase data from previous customer transactions.

8. An apparatus comprising:
a storage unit;
a central processing unit configured to receive customer data relating to a current customer;
a purchase advisor neural network stored in the storage unit and configured to respond to the customer data received by the central processing unit and identify a sales promotion for the current customer, wherein the response of the purchase advisor neural network for future customers is selectively adaptable by the central processing unit in response to customer data; and
a plurality of item identifiers stored in the storage unit, the item identifiers identifying items available for purchase, wherein the customer data includes data relating to purchases of items by the customer, and wherein the purchase advisor neural network is configured to identify the sales promotion by determining if one
or more of the item identifiers stored in the storage unit corresponds to an item likely to be purchased by the customer;

wherein the storage unit further includes a customer demographics neural network that estimates buying characteristics of one or more customers most likely to be at a purchase location, and also produces item identifiers comprising the estimated item purchases of the estimated customers.

9. The apparatus of claim 8, wherein the customer data includes data relating to a purchase of one or more items that occurred during a current customer visit to a purchase location, wherein the identified sales promotion comprises a list of items to be suggested for purchase during the current customer visit, wherein the central processing unit assigns the items purchased by the customer during the present customer visit into predetermined purchase classes comprising items frequently purchased together, wherein the purchase advisor neural network determines an item likely to be purchased by receiving the purchase class assignments from the central processing unit and identifying as likely to be purchased those items that are members of a purchase class observed to be in a purchase by the customer but are missing from the items purchased, and wherein the identified sales promotion comprises a listing of at least one of the items determined to be missing from one of the purchase classes to be suggested to the customer for purchase during the current customer visit.

10. The apparatus of claim 9, wherein the central processing unit selectively adapts the response of the purchase advisor neural network by updating at least one predetermined purchase class based upon purchase data from previous customer transactions.

11. The apparatus of claim 8, wherein the central processing unit receives the item identifiers of the estimated purchases from the customer demographics neural network, segments the item identifiers into purchase classes, and provides the purchase advisor neural network with the segmented item identifiers as input; and wherein the purchase advisor neural network responds to the input by determining if one or more of the item identifiers corresponds to an item likely to be purchased by one of the estimated customers.

12. The apparatus of claim 8, wherein the storage unit further includes a neural network training subsystem that collects a set of sales purchase data generated by customer purchases, selects a training epoch subset of the collected sales purchase data, and performs a neural network training process with the selected data, and wherein the neural network training subsystem further repeatedly collects data, selects a training subset, and performs the training process until all neural network training epoch data subsets in the collected sales purchase data have been processed.

13. The apparatus of claim 8, wherein the central processing unit selectively adapts the response of the purchase advisor neural network by retraining the purchase advisor neural network with purchase data from previous customer transactions.

14. A method of dynamically identifying sales opportunities for purchases of items by customers from an inventory of items, the method comprising:

training a purchase advisor neural network that generates an output set of item identifiers comprising sales opportunities for purchases of the items;

providing the trained purchase advisor neural network with customer data;

generating a sales opportunity output for a current customer with the trained purchase advisor neural network in response to the customer data, the output including one or more item identifiers that identify items in the inventory;

selecting a set of item identifiers from among the sales opportunity output generated by the purchase advisor neural network as potential purchases from the inventory of items; and selectively adapting the response of the purchase advisor neural network for future customers in response to customer data;

wherein selecting item identifiers of potential purchases for the customer comprises:

estimating buying characteristics of one or more customers most likely to be at a purchase location; and estimating item identifiers of items most likely to be purchased by the estimated customers.

15. The method of claim 14, wherein providing customer data comprises providing the purchase advisor neural network with data that relates to a purchase of one or more items by a customer that occurred during a present visit by the customer to a purchase location.

16. The method of claim 14, wherein training the purchase advisor neural network comprises:

collecting a set of sales purchase data for a plurality of customers;

selecting a training epoch subset of the collected sales purchase data;

performing a neural network training process with the selected data in which network coefficients are modified; and repeating the selection of training epoch subsets and the performance of the neural network training process until all neural network training epoch data subsets in the collected sales purchase data have been processed.

17. A method of dynamically identifying sales opportunities for purchases of items by customers from an inventory of items, the method comprising:

training a purchase advisor neural network that generates an output set of item identifiers comprising sales opportunities for purchases of the items;

providing the trained purchase advisor neural network with customer data;

generating a sales opportunity output for a current customer with the trained purchase advisor neural network in response to the customer data, the output including one or more item identifiers that identify items in the inventory;

selecting a set of item identifiers from among the sales opportunity output generated by the purchase advisor neural network as potential purchases from the inventory of items; and selectively adapting the response of the purchase advisor neural network for future customers in response to customer data;

wherein providing customer data comprises:

training a demographics neural network that generates an output set of data defining predicted purchases of customers during a purchasing transaction;

providing the trained demographics neural network with prediction data comprising the current date, current time of day, and environmental information; and generating with the demographics neural network predicted customer purchases.

18. The method of claim 14, wherein selectively adapting the response of the purchase advisor neural network includes retraining the purchase advisor neural network with purchase data from previous customer transactions.

19. A method of dynamically identifying a sales opportunity for a customer, the method comprising:

receiving customer data relating to a current customer;

generating with a purchase advisor neural network a sales opportunity output for the current customer in response to the customer data;

selectively adapting the response of the purchase advisor neural network for future customers in response to customer data from previous customer transactions;

providing a demographics neural network with prediction data comprising the current date, current time of day, and environmental information; and generating with the demographics neural network an output set of data defining predicted purchases of customers during a purchasing transaction based upon the prediction data.

20. The method of claim 19, wherein the customer data includes data relating to a selection of one or more items by a customer that occurred during a present visit by the customer to a purchase location, and wherein the sales opportunity output includes one or more item identifiers that identify additional items in the inventory.

21. The method of claim 19, wherein selectively adapting the response of the purchase advisor neural network includes retraining the purchase advisor neural network with purchase data from previous customer transactions.

* * * * *